US009917827B2

(12) United States Patent
Levergood et al.

(10) Patent No.: US 9,917,827 B2
(45) Date of Patent: Mar. 13, 2018

(54) INTERNET SERVER ACCESS CONTROL AND MONITORING SYSTEMS

(75) Inventors: Thomas Mark Levergood, Hopkinton, MA (US); Lawrence C. Stewart, Wayland, MA (US); Stephen Jeffrey Morris, Harvard, MA (US); Andrew C. Payne, Lincoln, MA (US); George Winfield Treese, Wayland, MA (US)

(73) Assignee: Soverain IP, LLC, McKinney, TX (US)

( * ) Notice: Subject to any disclaimer, the term of this patent is extended or adjusted under 35 U.S.C. 154(b) by 1458 days.

(21) Appl. No.: 11/971,361

(22) Filed: Jan. 9, 2008

(65) Prior Publication Data
US 2008/0109374 A1    May 8, 2008

Related U.S. Application Data

(63) Continuation of application No. 11/300,245, filed on Dec. 13, 2005, which is a continuation of application
(Continued)

(51) Int. Cl.
*G06Q 30/02* (2012.01)
*G06Q 30/06* (2012.01)
(Continued)

(52) U.S. Cl.
CPC ......... *H04L 63/0807* (2013.01); *G06Q 20/10* (2013.01); *G06Q 20/102* (2013.01);
(Continued)

(58) Field of Classification Search
CPC .............. H04L 63/0807; H04L 63/083; G06Q 30/0601; G06Q 30/06; G06Q 20/10;
(Continued)

(56) References Cited

U.S. PATENT DOCUMENTS

| 2,196,914 A | 4/1940 | Goldman |
| 4,073,368 A | 2/1978 | Mustapick |

(Continued)

FOREIGN PATENT DOCUMENTS

| EP | 0172670 | 2/1986 |
| EP | 0456920 | 11/1991 |

(Continued)

OTHER PUBLICATIONS

Louis Perrochon, Translation Servers: Gateway Between Stateless and Stateful Information Systems, Proceedings of the Network Service Conference, London, Nov. 1994, pp. 1-8.*

(Continued)

*Primary Examiner* — Patrice Winder
(74) *Attorney, Agent, or Firm* — Sterne, Kessler, Goldstein & Fox PLLC

(57) ABSTRACT

This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon such verification, the user is provided with a session identification which allows the user to access to the requested file as well as any other files within the present protection domain.

114 Claims, 7 Drawing Sheets

Related U.S. Application Data

No. 09/005,479, filed on Jan. 12, 1998, now Pat. No. 7,272,639, application No. 11/971,361, which is a continuation of application No. 09/548,235, filed on Apr. 12, 2000, now Pat. No. 8,635,327, and a continuation of application No. 09/548,237, filed on Apr. 12, 2000, now Pat. No. 8,606,900.

(51) Int. Cl.
  *G06Q 20/10* (2012.01)
  *G06Q 20/40* (2012.01)
  *H04L 29/06* (2006.01)

(52) U.S. Cl.
  CPC .......... *G06Q 20/401* (2013.01); *G06Q 30/02* (2013.01); *G06Q 30/0209* (2013.01); *G06Q 30/06* (2013.01); *G06Q 30/0601* (2013.01); *H04L 63/083* (2013.01)

(58) Field of Classification Search
  CPC .... G06Q 30/02; G06Q 20/401; G06Q 20/102; G06Q 30/0209
  USPC .............. 709/217–219, 225, 229; 705/53, 76
  See application file for complete search history.

(56) References Cited

U.S. PATENT DOCUMENTS

| | | | |
|---|---|---|---|
| 4,264,808 A | 4/1981 | Owens et al. | |
| 4,305,059 A | 12/1981 | Benton | |
| 4,317,957 A | 3/1982 | Sendrow | |
| 4,449,186 A | 5/1984 | Kelly et al. | |
| 4,484,304 A | 11/1984 | Anderson et al. | |
| 4,528,643 A | 7/1985 | Freeny, Jr. | |
| 4,529,870 A | 7/1985 | Chaum | |
| 4,547,851 A | 10/1985 | Kurland | |
| 4,566,078 A | 1/1986 | Crabtree | |
| 4,567,359 A | 1/1986 | Lockwood | |
| 4,578,530 A | 3/1986 | Zeidler | |
| 4,654,482 A | 3/1987 | DeAngelis | |
| 4,685,055 A | 8/1987 | Thomas | |
| 4,734,858 A | 3/1988 | Schlafly | |
| 4,755,940 A | 7/1988 | Brachtl et al. | |
| 4,759,063 A | 7/1988 | Chaum | |
| 4,759,064 A | 7/1988 | Chaum | |
| 4,775,935 A | 10/1988 | Yourick | |
| 4,791,566 A | 12/1988 | Sudama et al. | |
| 4,795,890 A | 1/1989 | Goldman | |
| 4,799,156 A | 1/1989 | Shavit et al. | |
| 4,805,134 A | 2/1989 | Calo et al. | |
| 4,812,628 A | 3/1989 | Boston et al. | |
| 4,827,508 A | 5/1989 | Shear | |
| 4,887,208 A | 12/1989 | Schneider et al. | |
| 4,891,503 A | 1/1990 | Jewell | |
| 4,922,521 A | 5/1990 | Krikke et al. | |
| 4,926,480 A | 5/1990 | Chaum | |
| 4,931,932 A | 6/1990 | Dalnekoff et al. | |
| 4,935,870 A | 6/1990 | Burk, Jr. et al. | |
| 4,941,089 A | 7/1990 | Fischer | |
| 4,947,028 A | 8/1990 | Gorog | |
| 4,947,430 A | 8/1990 | Chaum | |
| 4,949,380 A | 8/1990 | Chaum | |
| 4,959,686 A | 9/1990 | Spallone et al. | |
| 4,972,318 A | 11/1990 | Brown et al. | |
| 4,977,595 A | 12/1990 | Ohta et al. | |
| 4,982,346 A | 1/1991 | Girouard et al. | |
| 4,984,155 A | 1/1991 | Geier et al. | |
| 4,987,593 A | 1/1991 | Chaum | |
| 4,991,210 A | 2/1991 | Chaum | |
| 4,992,940 A | 2/1991 | Dworkin | |
| 4,996,711 A | 2/1991 | Chaum | |
| 5,025,373 A | 6/1991 | Keyser, Jr. et al. | |
| 5,035,515 A | 7/1991 | Crossman et al. | |
| 5,047,614 A | 9/1991 | Bianco | |
| 5,060,153 A | 10/1991 | Nakagawa | |
| 5,077,607 A | 12/1991 | Johnson et al. | |
| 5,105,184 A | 4/1992 | Pirani et al. | |
| 5,113,496 A | 5/1992 | McCalley et al. | |
| 5,157,783 A | 10/1992 | Anderson et al. | |
| 5,165,020 A | 11/1992 | Sudama et al. | |
| 5,204,947 A | 4/1993 | Bernstein et al. | |
| 5,220,501 A | 8/1993 | Lawlor et al. | |
| 5,235,509 A | 8/1993 | Mueller et al. | |
| 5,247,575 A | 9/1993 | Sprague et al. | |
| 5,265,239 A | 11/1993 | Ardolino | |
| 5,276,736 A | 1/1994 | Chaum | |
| 5,285,383 A | 2/1994 | Lindsey et al. | |
| 5,297,249 A | 3/1994 | Bernstein et al. | |
| 5,305,195 A | 4/1994 | Murphy | |
| 5,309,437 A | 5/1994 | Perlman et al. | |
| 5,310,997 A | 5/1994 | Roach et al. | |
| 5,311,594 A | 5/1994 | Penzias | |
| 5,313,637 A | 5/1994 | Rose | |
| 5,319,542 A | 6/1994 | King, Jr. et al. | |
| 5,321,751 A | 6/1994 | Ray et al. | |
| 5,325,362 A | 6/1994 | Aziz | |
| 5,329,619 A | 7/1994 | Page et al. | |
| 5,336,870 A | 8/1994 | Hughes et al. | |
| 5,341,429 A | 8/1994 | Stringer et al. | |
| 5,347,632 A | 9/1994 | Filepp et al. | |
| 5,351,186 A | 9/1994 | Bullock et al. | |
| 5,351,293 A | 9/1994 | Michener et al. | |
| 5,353,283 A | 10/1994 | Tsuchiya | |
| 5,383,113 A | 1/1995 | Kight et al. | |
| 5,388,257 A | 2/1995 | Bauer | |
| 5,414,833 A | 5/1995 | Hershey et al. | |
| 5,414,841 A | 5/1995 | Bingham et al. | |
| 5,434,918 A | 7/1995 | Kung et al. | |
| 5,440,479 A | 8/1995 | Hutton | |
| 5,455,953 A * | 10/1995 | Russell | 710/266 |
| 5,457,738 A | 10/1995 | Sylvan | |
| 5,475,585 A | 12/1995 | Bush | |
| 5,483,652 A | 1/1996 | Sudama et al. | |
| 5,491,820 A | 2/1996 | Belove et al. | |
| 5,506,961 A | 4/1996 | Carlson et al. | |
| 5,521,631 A | 5/1996 | Budow et al. | |
| 5,526,483 A | 6/1996 | French et al. | |
| 5,530,852 A | 6/1996 | Meske, Jr. et al. | |
| 5,535,229 A | 7/1996 | Hain, Jr. et al. | |
| 5,539,735 A | 7/1996 | Moskowitz | |
| 5,542,046 A | 7/1996 | Carlson et al. | |
| 5,544,320 A | 8/1996 | Konrad | |
| 5,544,322 A | 8/1996 | Cheng et al. | |
| 5,550,984 A | 8/1996 | Gelb | |
| 5,557,516 A | 9/1996 | Hogan | |
| 5,557,518 A | 9/1996 | Rosen | |
| 5,557,798 A | 9/1996 | Skeen et al. | |
| 5,560,008 A | 9/1996 | Johnson et al. | |
| 5,576,951 A | 11/1996 | Lockwood | |
| 5,577,209 A | 11/1996 | Boyle et al. | |
| 5,581,753 A | 12/1996 | Terry et al. | |
| 5,583,996 A | 12/1996 | Tsuchiya | |
| 5,590,197 A | 12/1996 | Chen et al. | |
| 5,592,378 A | 1/1997 | Cameron et al. | |
| 5,594,910 A | 1/1997 | Filepp et al. | |
| 5,596,642 A | 1/1997 | Davis et al. | |
| 5,596,643 A | 1/1997 | Davis et al. | |
| 5,598,535 A | 1/1997 | Brech et al. | |
| 5,598,536 A | 1/1997 | Slaughter, III et al. | |
| 5,603,025 A | 2/1997 | Tabb et al. | |
| 5,604,802 A | 2/1997 | Holloway | |
| 5,619,648 A | 4/1997 | Canale et al. | |
| 5,621,797 A | 4/1997 | Rosen | |
| 5,623,547 A | 4/1997 | Jones et al. | |
| 5,623,656 A | 4/1997 | Lyons | |
| 5,638,519 A | 6/1997 | Haluska | |
| 5,642,419 A | 6/1997 | Rosen | |
| 5,642,515 A | 6/1997 | Jones et al. | |
| 5,649,185 A | 7/1997 | Antognini et al. | |
| 5,664,110 A | 9/1997 | Green et al. | |
| 5,664,111 A | 9/1997 | Nahan et al. | |
| 5,675,507 A | 10/1997 | Bobo, II | |
| 5,684,965 A | 11/1997 | Pickering | |

(56) References Cited

U.S. PATENT DOCUMENTS

| | | | |
|---|---|---|---|
| 5,687,367 A | 11/1997 | Dockter et al. | |
| 5,689,638 A | 11/1997 | Sadovsky | |
| 5,694,546 A | 12/1997 | Reisman | |
| 5,694,549 A * | 12/1997 | Carlin et al. | 709/250 |
| 5,694,551 A | 12/1997 | Doyle et al. | |
| 5,696,965 A | 12/1997 | Dedrick | |
| 5,703,949 A | 12/1997 | Rosen | |
| 5,708,780 A | 1/1998 | Levergood et al. | |
| 5,710,884 A | 1/1998 | Dedrick | |
| 5,712,989 A | 1/1998 | Johnson et al. | |
| 5,715,314 A | 2/1998 | Payne et al. | |
| 5,721,780 A | 2/1998 | Ensor et al. | |
| 5,724,424 A | 3/1998 | Gifford | |
| 5,724,521 A | 3/1998 | Dedrick | |
| 5,727,164 A | 3/1998 | Kaye et al. | |
| 5,732,219 A | 3/1998 | Blummer et al. | |
| 5,734,719 A | 3/1998 | Tsevdos et al. | |
| 5,761,662 A | 6/1998 | Dasan | |
| 5,768,142 A | 6/1998 | Jacobs | |
| 5,768,521 A | 6/1998 | Dedrick | |
| 5,771,354 A * | 6/1998 | Crawford | 709/229 |
| 5,774,670 A | 6/1998 | Montulli | |
| 5,784,565 A | 7/1998 | Lewine | |
| 5,787,416 A | 7/1998 | Tabb et al. | |
| 5,790,793 A | 8/1998 | Higley | |
| 5,806,077 A | 8/1998 | Wecker | |
| 5,812,776 A | 9/1998 | Gifford | |
| 5,819,092 A | 10/1998 | Ferguson et al. | |
| 5,826,241 A | 10/1998 | Stein et al. | |
| 5,826,242 A | 10/1998 | Montulli | |
| 5,842,185 A | 11/1998 | Chancey et al. | |
| 5,848,399 A | 12/1998 | Burke | |
| 5,848,413 A | 12/1998 | Wolff | |
| 5,870,552 A | 2/1999 | Dozier et al. | |
| 5,895,454 A | 4/1999 | Harrington | |
| 5,897,622 A | 4/1999 | Blinn et al. | |
| 5,909,492 A | 6/1999 | Payne et al. | |
| 5,913,040 A | 6/1999 | Rakavy et al. | |
| 5,920,847 A | 7/1999 | Kolling et al. | |
| 5,982,891 A | 11/1999 | Ginter et al. | |
| 5,999,711 A | 12/1999 | Misra et al. | |
| 6,006,199 A | 12/1999 | Berlin et al. | |
| 6,023,683 A | 2/2000 | Johnson et al. | |
| 6,041,316 A | 3/2000 | Allen | |
| 6,049,785 A | 4/2000 | Gifford | |
| 6,125,388 A | 9/2000 | Reisman | |
| 6,134,592 A | 10/2000 | Montulli | |
| 6,135,646 A | 10/2000 | Kahn et al. | |
| 6,148,343 A | 11/2000 | Lewine | |
| 6,175,921 B1 | 1/2001 | Rosen | |
| 6,182,052 B1 | 1/2001 | Fulton et al. | |
| 6,195,649 B1 | 2/2001 | Gifford | |
| 6,199,051 B1 | 3/2001 | Gifford | |
| 6,205,437 B1 | 3/2001 | Gifford | |
| 6,230,202 B1 | 5/2001 | Lewine | |
| 6,249,865 B1 | 6/2001 | Walker et al. | |
| 6,449,599 B1 | 9/2002 | Payne et al. | |
| 6,507,872 B1 | 1/2003 | Geshwind | |
| 6,594,692 B1 | 7/2003 | Reisman | |
| 6,684,333 B1 | 1/2004 | Walker et al. | |
| 6,708,157 B2 | 3/2004 | Stefik et al. | |
| 5,708,780 C1 | 4/2006 | Levergood et al. | |
| 5,909,492 C1 | 8/2007 | Payne et al. | |
| 7,272,639 B1 | 9/2007 | Levergood et al. | |
| 5,715,314 C1 | 10/2007 | Payne et al. | |
| 7,272,639 C1 | 10/2011 | Levergood et al. | |
| 2006/0095526 A1 | 5/2006 | Levergood et al. | |
| 2008/0201344 A1 | 8/2008 | Levergood et al. | |

FOREIGN PATENT DOCUMENTS

| | | |
|---|---|---|
| EP | 0542298 | 5/1993 |
| EP | 0645688 | 3/1995 |
| GB | 2102606 | 2/1983 |
| JP | 3278230 | 12/1991 |
| JP | 410191 | 1/1992 |
| JP | 05158963 | 6/1993 |
| JP | 5274275 | 10/1993 |
| JP | 6162059 | 6/1994 |
| JP | 6291776 | 10/1994 |
| WO | WO 91/16691 | 10/1991 |
| WO | WO 93/10503 | 5/1993 |
| WO | WO 94/03859 | 2/1994 |
| WO | WO 95/16971 | 6/1995 |
| WO | WO 96/42041 | 12/1996 |

OTHER PUBLICATIONS

Decision on Petition for Rehearing, Soverain Software LLC v. Newegg Inc., Case No. 2011-1009, United States Court of Appeals for the Federal Circuit, mailed Sep. 4, 2013; 7 pages.

Order on Petition for En Banc Rehearing, Soverain Software LLC v. Newegg Inc., Case No. 2011-1009, United States Court of Appeals for the Federal Circuit, mailed Sep. 4, 2013; 2 pages.

Denial of Petition of Writ of Certiorari, Soverain Software LLC v. Newegg Inc., Case No. 13-477, Supreme Court of the United States, Order List: 571 U.S., dated Monday, Jan. 13, 2014; 30 pages.

"Customer Showcase", Internet Applications Customer Showcase, Internet, Netscape Communications Corporation, Sep. 18, 1995., pp. 1-2.

"Netscape Istore Data Sheet" Internet, Istore, Netscape Communications Corporation, Sep. 18, 1995, 2 pages.

"Netscape Merchant System Data Sheet", Merchant System: Overview, Internet, Netscape Communications Corporation, Sep. 18, 1995, 3 pages.

"Open and Secure Internet Software", Netscape Products, Internet, Netscape Communications Corporation, Sep. 18, 1995, 2 pages.

"The Object-Oriented Paradigm of Server Configuration", Internet, Netscape Standards Documentation, Sep. 18, 1995, pp. 1-2.

"The SSL Protocol", Internet, Netscape Communications Corporation, Feb. 9, 1995, 18 pages.

"VeriSign, Inc. Adds the Missing Component to Online Security Solutions", VeriSign Press Release, Internet, VeriSign, Inc., Sep. 18, 1995, 2 pages.

"VeriSign, Inc. to Provide Digital IDs for Open Market's Secure WebServer", VeriSign Press Release, Internet, VeriSign, Inc., Sep. 18, 1995, 2 pages.

Berners-Lee, T., et al., "Target a Common Internet Syntax Where the User Password is Appended to a Specific URL," retrieved from: http://www.ietf.org/rfc/rfc1738.txt, Dec. 1994, 24 pages.

Bieber, M. et al., "Backtracking in a Multiple Window Hypertext Environment", ECHT '94 Proceedings of the 1994 ACM European conference on Hypertext technology, ACM, Sep. 1994, 15 pages.

Estrin et al., "Visa Protocols for Controlling Inter-Organizational Datagram Flow: Extended Description", WRL Research Report 88/5, Western Research Laboratory, Palo Alto, California, Dec. 1988, 41 pages.

Franks et al., "An Extension to HTTP: Digest Access Authentication", Network Working Group, RFC 2069, Jan. 1997, 18 pages.

Gifford, D., "Notes on Community Information Systems", MIT LCS TM-419, Dec. 10, 1989, 8 pages.

International Search Report for International Patent Application No. PCT/US1996/07838, dated Jan. 27, 1997, 5 pages.

The Server-Application Function and Netscape Server API, "The Netscape Server API" Internet, Netscape Products, Sep. 18, 1995, 15 pages.

Varela et al., "Zelig: Schema-Based Generation of Soft WWW Database Applications", University of Illinois at Urbana—Champaign, Department of Computer Science, 1994, 8 pages.

Verisign Redirection Information, "Important Announcement" Internet, RSA Data Security, Inc., Sep. 18, 1995, 2 pages.

Wiil et al., "Hyperform: Using Extensibility to Develop Dynamic, Open and Distributed Hypertext Systems", Milano, Dec. 1992, 11 pages.

Notice of Intent to Issue a Reexamination Certificate, dated Jul. 14, 2011, for Reexamination Control No. 90/011,444 in Reexamination of U.S. Pat. No. 7,272,639, dated Sep. 18, 2007, 13 pages.

(56) References Cited

OTHER PUBLICATIONS

Non-Final Office Action dated Mar. 1, 2012, for Reexamination Control No. 90/011,937, filed Sep. 30, 2011, in Reexamination of U.S. Pat. No. 7,272,639, dated Sep. 18, 2007, 7 pages.
Patent Owner's Reply dated May 1, 2012, to First Office Action Under 37 C.F.R. § 1.111 and 1.550 in Ex Parte Reexamination with Exhibits, for Reexamination Control No. 90/011,937, filed Sep. 30, 2011, in Reexamination of U.S. Pat. No. 7,272,639, dated Sep. 18, 2007, 152 pages.
Request dated Sep. 30, 2011, for Ex Parte Reexamination of Control No. 90/011,937, in Reexamination of U.S. Pat. No. 7,272,639, dated Sep. 18, 2007, 81 pages.
USPTO Order dated Dec. 6, 2011, granting request for Ex Parte Reexamination Control No. 90/011,937, in Reexamination of U.S. Pat. No. 7,272,639, dated Sep. 18, 2007, 22 pages.
Non-Final Office Action dated Mar. 17, 2005, for Reexamination Control No. 90/007,183, filed Aug. 24, 2004, in Reexamination of U.S. Pat. No. 5,708,780, dated Jan. 13, 1998, 35 pages.
Notice of Intent to Issue a Reexamination Certificate, dated Jul. 27, 2005, for Reexamination Control No. 90/007,183, filed Aug. 24, 2004, in Reexamination of U.S. Pat. No. 5,708,780, dated Jan. 13, 1998, 6 pages.
Novick, B., "The Clickstream", (9503) Internet Marketing: The Clickstream, retrieved from http://www.i-m.com/archives/9503/0375.html, Mar. 20, 1995, 3 pages.
Phillips, "SuperHighway Access Eases Internet Entry", Netweek: A Section for Implementers of Enterprise-Wide Systems, PC Week, Oct. 31, 1994, 3 pages.
Request dated Aug. 24, 2004, for ex parte reexamination of U.S. Pat. No. 5,708,780 dated Jan. 13, 1998, 73 pages.
Rescorla, E. et al., "The Secure HyperText Transfer Protocol," Enterprise Integration Technologies, Experimental, Request for Comments XXXX, Jun. 1994, 23 pages.
Rescorla, E. et al., "The Secure HyperText Transfer," Internet-Draft (Expired May 1995), Enterprise Integration Technologies, Dec. 1994, 35 pages.
USPTO Order dated Oct. 21, 2004, granting request for ex parte reexamination of U.S. Pat. No. 5,708,780, dated Jan. 13, 1998, 5 pages.
Declaration dated Aug. 20, 2004, of John D. Vandenberg in Support of Defendant Amazon.com, Inc.'s Reply in Support of its Motion for Partial Summary Judgment of Non-Infringement ('780 Patent), *Soverain Software LLC v. Amazon.com, Inc., et al.* (E.D. Tex. 6:04-cv-00014), 3 pages.
Declaration dated Aug. 9, 2004, of Jack D. Grimes, Ph.D., in Opposition to Defendant Amazon.com, Inc.'s Motion for Partial Summary Judgment of Non-Infringement ('780 Patent ), *Soverain Software LLC v. Amazon.com, Inc., et al.* (E.D. Tex. 6:04-cv-00014), 62 pages.
Motion dated Jun. 10, 2005, by Amazon.com for Partial Summary Judgment that claims are Indefinite under 35 U.S.C 112, *Soverain Software LLC v. Amazon.com, Inc., et al.* (E.D. Tex. 6:04-cv-00014), 21 pages.
Third Supplemental Response dated Sep. 2004, to Amazon.com's First Set of Interrogatories (Nos. 1-14), *Soverain Software LLC v. Amazon.com, Inc., et al.* (E.D. Tex 6:04-cv-00014), 9 pages.
Transcript dated Feb. 22, 2005, of Videotaped Deposition of Michael Kuniavsky with Exhibits, *Soverain Software LLC v. Amazon.com, Inc., et al.* (E.D. Tex. 6:04-cv-00014), 621 pages.
Unopposed Motion dated May 18, 2005, by Amazon.com, Inc. for Leave to Amend its Answer to Include Allegations Regarding Stuff.com, *Soverain Software LLC v. Amazon.com, Inc., et al.* (E.D. Tex. 6:04-cv-00014), 9 pages.
Amended Complaint dated Nov. 23, 2007, by Soverain Software LLC for Patent Infringement of U.S. Pat. Nos. 5,715,314, 5,909,492, and 7,272,639, *Soverain Software LLC v. CDW Corporation et al.*, (E.D. Tex. 6:07-cv-00511), 13 pages.

Brief dated Dec. 7, 2010, by Appellant Newegg, Inc., Appeal from the United States Court of Appeals, Federal Circuit No. 2011-1009, *Soverain Software LLC v. CDW Corporation et al.*, (E.D. Tex. 6:07-cv-00511), 28 pages.
Brief dated Mar. 28, 2011, by Plaintiff-Appellee Soverain Software LLC, Appeal from the United States Court of Appeals, Federal Circuit No. 2011-1009, *Soverain Software LLC v. CDW Corporation et al.*, (E.D. Tex. 6:07-cv-00511), 75 pages.
Complaint dated Nov. 2, 2007, by Soverain Software LLC for Patent Infringement of U.S. Pat. Nos. 5,715,314, 5,909,492, and 7,272,639, *Soverain Software LLC v. CDW Corporation et al.*, (E.D. Tex. 6:07-cv-00511), 132 pages.
Document Listing dated Aug. 31, 2009, from Paragraph 29 of Defendant Shutterfly's Answer to Complaint and Counterclaims, *Soverain Software LLC v. CDW Corporation et al.*, (E.D. Tex. 6:07-cv-00511), 2 pages.
Joint Invalidity Contentions dated Aug. 20, 2008, for CDW Corporation, Newegg Inc., and Zappos.com, *Soverain Software LLC v. CDW Corporation et al.*, (E.D. Tex. 6:07-cv-00511), 132 pages.
Memorandum Opinion and Order dated Aug. 11, 2010, ordered and signed by Judge Leonard Davis, *Soverain Software LLC v. CDW Corporation et al.*, (E.D. Tex. 6:07-cv-00511), 32 pages.
Motions In Limine dated Jan. 13, 2010, by Soverain Software LLC, with attachments, *Soverain Software LLC v. CDW Corporation et al.*, (E.D. Tex. 6:07-cv-00511), 45 pages.
Opposition dated Jun. 7, 2010, by Plaintiff Soverain Software LLC, to Newegg's Renewed Motion for Judgment as a Matter of Law of Non-Infringement and Invalidity of the Asserted Claims and Alternative Motions for New Trial (Redacted), *Soverain Software LLC v. CDW Corporation et al.*, (E.D. Tex. 6:07-cv-00511), 29 pages.
Renewed Motion dated May 24, 2010, by Plaintiff Soverain Software LLC, for Judgment as a Matter of Law of Infringement of the '314, '492, and '639 Patents and for a New Trial on '639 Patent Damages (Redacted), *Soverain Software LLC v. CDW Corporation et al.*, (E.D. Tex. 6:07-cv-00511), 68 pages.
Renewed Motions dated May 24, 2010, by Defendant Newegg, Inc., for Judgment as a Matter of Law of Non-Infringement and Invalidity of the Asserted Claims and Alternative Motions for New Trial (Redacted), *Soverain Software LLC v. CDW Corporation et al.*, (E.D. Tex. 6:07-cv-00511), 33 pages.
Reply Brief dated Apr. 14, 2011, by Appellant Newegg, Inc., Appeal from the United States Court of Appeals, Federal Circuit No. 2011-1009, *Soverain Software LLC v. CDW Corporation et al.*, (E.D. Tex. 6:07-cv-00511), 13 pages.
Reply dated Jun. 14, 2010, by Defendant Newegg, Inc., in Support of its Renewed Motion for Judgment as a Matter of Law of Non-Infringement and Invalidity of the Asserted Claims and Alternative Motions for Judgment as a Matter of Law of Non-Infringement and Invalidity of the Asserted Claims and Alternative Motions for New Trial (Redacted), *Soverain Software LLC v. CDW Corporation et al.*, (E.D. Tex. 6:07-cv-00511), 12 pages.
Reply dated Jun. 14, 2010, by Plaintiff Soverain Software LLC, in Support of its Renewed Motion for Judgment as a Matter of Law of Infringement of the '314, '492, and '639 Patents and for a New Trial on '639 Patent Damages (Redacted), *Soverain Software LLC v. CDW Corporation et al.*, (E.D. Tex. 6:07-cv-00511), 13 pages.
Reply dated Oct. 21, 2009, by Newegg, Inc., to Plaintiff's Response to Newegg's Motion for Summary Judgment of Invalidity of the "Shopping Cart Claims" in U.S. Pat. Nos. 5,715,314 and 5,909,492, *Soverain Software LLC v. CDW Corporation et al.*, (E.D. Tex. 6:07-cv-00511), 5 pages.
Response dated Jun. 7, 2010, by Defendant Newegg, Inc., to Soverain's Renewed Motion for Judgment as a Matter of Law of Infringement and for a New Trial on '639 Patent Damages, *Soverain Software LLC v. CDW Corporation et al.*, (E.D. Tex. 6:07-cv-00511), 15 pages.
Surreply dated Jun. 21, 2010, by Defendant Newegg, Inc., in Opposition to Plaintiff Soverain's Renewed Motion for Judgment as a Matter of Law of Infringement of the '314, '492, and '639 Patents, and for a New Trial on '639 Patent Damages, *Soverain Software LLC v. CDW Corporation et al.*, (E.D. Tex. 6:07-cv-00511), 8 pages.

(56) References Cited

OTHER PUBLICATIONS

Surreply dated Jun. 21, 2010, by Plaintiff Soverain Software LLC, in Opposition to Newegg's Renered Motion for Judgment as a Matter of Law of Non-Infringement and Invalidity of the Asserted Claims and Alternative Motions for New Trial (Redacted), *Soverain Software LLC* v. *CDW Corporation et al.*, (E.D. Tex. 6:07-cv-00511), 11 pages.
Amended P.R. 4-3 Joint Claim Construction dated Oct. 6, 2010, with Prehearing Statement and Exhibits, *Soverain Software LLC* v. *J.C. Penney Corporation, Inc. et al.*, (E.D. Tex. 6:09-cv-00274), 42 pages.
Answer dated Apr. 27, 2010, by Defendant Avon Products, Inc., to Soverain's Complaint for Patent Infringement, with Counterclaims, *Soverain Software LLC* v. *J.C. Penney Corporation, Inc. et al.*, (E.D. Tex. 6:09-cv-00274), 21 pages.
Answer dated Aug. 26, 2009, by Defendant Ballard Design, Inc., to Soverain's Complaint for Patent Infringement, with Counterclaims, *Soverain Software LLC* v. *J.C. Penney Corporation, Inc. et al.*, (E.D. Tex. 6:09-cv-00274), 42 pages.
Answer dated Aug. 26, 2009, by Defendant Cornerstone Brands, Inc., to Soverain's Complaint for Patent Infringement, with Counterclaims, *Soverain Software LLC* v. *J.C. Penney Corporation, Inc. et al.*, (E.D. Tex. 6:09-cv-00274), 41 pages.
Answer dated Aug. 26, 2009, by Defendant Garnet Hill, Inc., to Soverain's Complaint for Patent Infringement, with Counterclaims, *Soverain Software LLC* v. *J.C. Penney Corporation, Inc. et al.*, (E.D. Tex. 6:09-cv-00274), 41 pages.
Answer dated Aug. 26, 2009, by Defendant HSN Improvements, LLC, to Soverain's Complaint for Patent Infringement, with Counterclaims, *Soverain Software LLC* v. *J.C. Penney Corporation, Inc. et al.*, (E.D. Tex. 6:09-cv-00274), 42 pages.
Answer dated Aug. 26, 2009, by Defendant HSN Inc., to Soverain's Complaint for Patent Infringement, with Counterclaims, *Soverain Software LLC* v. *J.C. Penney Corporation, Inc. et al.*, (E.D. Tex. 6:09-cv-00274), 41 pages.
Answer dated Aug. 26, 2009, by Defendant Smith & Noble LLC, to Soverain's Complaint for Patent Infringement, with Counterclaims, *Soverain Software LLC* v. *J.C. Penney Corporation, Inc. et al.*, (E.D. Tex. 6:09-cv-00274), 41 pages.
Answer dated Aug. 26, 2009, by Defendant The Terrirory Ahead, Inc., to Soverain's Complaint for Patent Infringement, with Counterclaims, *Soverain Software LLC* v. *J.C. Penney Corporation, Inc. et al.*, (E.D. Tex. 6:09-cv-00274), 41 pages.
Answer dated Aug. 27, 2009, by Defendant Bidz.com, Inc., to Soverain's Complaint for Patent Infringement, with Counterclaims, *Soverain Software LLC* v. *J.C. Penney Corporation, Inc. et al.*, (E.D. Tex. 6:09-cv-00274), 17 pages.
Answer dated Aug. 31, 2009, by Defendant Amway Corp., to Soverain's Complaint for Patent Infringement, with Counterclaims, *Soverain Software LLC* v. *J.C. Penney Corporation, Inc. et al.*, (E.D. Tex. 6:09-cv-00274), 47 pages.
Answer dated Aug. 31, 2009, by Defendant Shutterfly, Inc., to Soverain's Complaint for Patent Infringement, with Counterclaims, *Soverain Software LLC* v. *J.C. Penney Corporation, Inc. et al.*, (E.D. Tex. 6:09-cv-00274), 56 pages.
Answer dated Sep. 14, 2009, by Defendant J.C. Penney Corporation, Inc., to Soverain's Complaint for Patent Infringement, with Counterclaims, *Soverain Software LLC* v. *J.C. Penney Corporation, Inc. et al.*, (E.D. Tex. 6:09-cv-00274), 20 pages.
Answer dated Sep. 15, 2009, by Defendant QVC, Inc., to Soverain's Complaint for Patent Infringement, with Defenses and Counterclaims, *Soverain Software LLC* v. *J.C. Penney Corporation, Inc. et al.*, (E.D. Tex. 6:09-cv-00274), 22 pages.
Answer dated Sep. 15, 2009, by Defendant Vistaprint Ltd., to Soverain's Complaint for Patent Infringement, with Affirmative Defenses and Counterclaims, *Soverain Software LLC* v. *J.C. Penney Corporation, Inc. et al.*, (E.D. Tex. 6:09-cv-00274), 39 pages.
Answer dated Sep. 15, 2009, by Defendant Vistaprint USA, Inc., to Soverain's Complaint for Patent Infringement, with Affirmative Defenses and Counterclaims, *Soverain Software LLC* v. *J.C. Penney Corporation, Inc. et al.*, (E.D. Tex. 6:09-cv-00274), 38 pages.
Answer dated Sep. 15, 2009, by Defendants Victoria's Secret Stores Brand Management, Inc. and Victoria's Secret Direct Brand Management, LLC, to Soverain's Complaint for Patent Infringement, with Affirmative Defenses and Counterclaims, *Soverain Software LLC* v. *J.C. Penney Corporation, Inc. et al.*, (E.D. Tex. 6:09-cv-00274), 24 pages.
Defendants' Motion dated Sep. 1, 2011, for Expedited Briefing for the Motion to Clarify the Scope of the Claim Term "Computer", *Soverain Software LLC* v. *J.C. Penney Corporation, Inc. et al.*, (E.D. Tex. 6:09-cv-00274), 6 pages.
Defendants' Motion dated Sep. 1, 2011, for More Definite Statement to Clarify the Scope of the Claim Term "Computer" by Avon Products, Inc., Bidz.com, Inc., J.C. Penney Corporation, Inc., Visctoria's Secret Direct Brand Management, LLC, and Victoria's Secret Stores Brand Management, Inc. with Exhibits, *Soverain Software LLC* v. *J.C. Penney Corporation, Inc. et al.*, (E.D. Tex. 6:09-cv-00274), 17 pages.
Defendants' Reply dated Sep. 26, 2011, in Support of their Motion to Clarify the Scope of the Claim Term "Computer", *Soverain Software LLC* v. *J.C. Penney Corporation, Inc. et al.*, (E.D. Tex. 6:09-cv-00274), 53 pages.
First Amended Answer dated Nov. 30, 2010, by Defendant J.C. Penney Corporation, Inc., to Soverain's Complaint for Patent Infringement, with Counterclaims, *Soverain Software LLC* v. *J.C. Penney Corporation, Inc. et al.*, (E.D. Tex. 6:09-cv-00274), 21 pages.
Memorandum Opinion dated Jan. 13, 2011, *Soverain Software LLC* v. *J.C. Penney Corporation, Inc. et al.*, (E.D. Tex. 6:09-cv-00274), 31 pages.
Motion dated Jan. 24, 2011, by Defendants, for Leave to Amend Invalidity Contentions, Redacted, *Soverain Software LLC* v. *J.C. Penney Corporation, Inc. et al.*, (E.D. Tex. 6:09-cv-00274), 16 pages.
Motions in Limine dated Apr. 11, 2011, by Soverain Software LLC, *Soverain Software LLC* v. *J.C. Penney Corporation, Inc. et al.*, (E.D. Tex. 6:09-cv-00274), 20 pages.
Opening Claim Construction Brief dated Sep. 20, 2010, by Soverain Software LLC, Pursuant to Patent Rule 4-5(a), with Exhibits A-M, *Soverain Software LLC* v. *J.C. Penney Corporation, Inc. et al.*, (E.D. Tex. 6:09-cv-00274), 745 pages.
Order dated Apr. 21, 2011, on Pre-Trial Motions, *Soverain Software LLC* v. *J.C. Penney Corporation, Inc. et al.*, (E.D. Tex. 6:09-cv-00274), 4 pages.
P.R. 4-3 Joint Claim Construction dated Aug. 31, 2010, with Prehearing Statement, *Soverain Software LLC* v. *J.C. Penney Corporation, Inc. et al.*, (E.D. Tex. 6:09-cv-00274), 67 pages.
Patent Rule 4-5(c) Reply dated Oct. 22, 2010, by Soverain Software LLC, to Defendants' Responsive Claim Construction Briefs, *Soverain Software LLC* v. *J.C. Penney Corporation, Inc. et al.*, (E.D. Tex. 6:09-cv-00274), 34 pages.
Plaintiff's Motion dated Sep. 6, 2011, in Opposition to the Defendants' Motion for Expedited Briefing on their Motion to Clarify the Scope of the Claim Term "Computer", *Soverain Software LLC* v. *J.C. Penney Corporation, Inc. et al.*, (E.D. Tex. 6:09-cv-00274), 6 pages.
Responsive Brief dated Oct. 15, 2010, by Avon Products Inc., on Claim Construction for the term "Stored Session Identifier" in the Asserted '639 Patent Claims, *Soverain Software LLC* v. *J.C. Penney Corporation, Inc. et al.*, (E.D. Tex. 6:09-cv-00274), 210 pages.
Responsive Claim Construction Brief dated Oct. 15, 2010, by Amway Corp. to which QVC, Inc. Joins in Part, with Exhibits A-H, *Soverain Software LLC* v. *J.C. Penney Corporation, Inc. et al.*, (E.D. Tex. 6:09-cv-00274), 255 pages.
Responsive Claim Construction Brief dated Oct. 15, 2010, by the Defendants, Pursuant to Patent Rule 4-5(b), with Exhibits, *Soverain Software LLC* v. *J.C. Penney Corporation, Inc. et al.*, (E.D. Tex. 6:09-cv-00274), 422 pages.
Revised Opening Claim Construction dated Oct. 8, 2010, by Soverain Software LLC, Pursuant to Patent Rule 4-5(a), *Soverain Software LLC* v. *J.C. Penney Corporation, Inc. et al.*, (E.D. Tex. 6:09-cv-00274), 340 pages.

(56) References Cited

OTHER PUBLICATIONS

Transcript dated Feb. 11, 2011, of the Markman Hearing Before the Honorable Leonard David United States District Judge, *Soverain Software LLC v. J.C. Penney Corporation, Inc. et al.*, (E.D. Tex. 6:09-cv-00274), 92 pages.
Unopposed Motion dated Jan. 4, 2011, to Supplement Infringement Contentions Pursuant to P.R. 3-6(b) filed by Plaintiff Soverain Software LLC, *Soverain Software LLC v. J.C. Penney Corporation, Inc. et al.*, (E.D. Tex. 6:09-cv-00274), 6 pages.
Pitkow et al., "Integrating Bottom-Up and Top-Down Analysis For Intelligent Hypertext", Intelligent Hypertext Workshop, 3rd International Conference on Information and Knowledge Management, Dec. 1994, 4 pages.
"Advanced Electronic Credit Authorization Through the Amherst Group SNET", News Release, Dec. 7, 1987, pp. 1-2.
"CompuServe Videotex Network Offers Marketing Research Service, Ad Test," Marketing News, Nov. 25, 1983 p. 21.
"Electronic In-Home Shopping: "Our Stores are Always Open","" Chain Store Age Executive, Mar. 1985, pp. 111,116.
"Mall Offers Holiday Treat for Hackers," Advertising Age, Nov. 13, 1985, p. 76.
"Redcoats Join Communications Fight." Industry Week, Feb. 22, 1982, pp. 108-109.
"Suddenly, Videotex is Finding an Audience," Business Week, Oct. 19, 1987, pp. 92-94.
"Taking Advantage of the Past," Advertising Age, Apr. 11, 1983, pp. M36-37.
57 USPQ2D, "*Amazon.com, Inc. v. Barnesandnoble.com, Inc.*" pp. 1746-1763.
Abadi, M. et al.; "Authentication and Delegation with Smart-Cards" Report 67; Systems Research Center; Digital Equipment Corporation; Palo Alto, California; Oct. 22, 1990, revised Jul. 30, 1992, 24 pgs.
Aho, A.V., et al., "Reports and Databases." In the AWK Programming Language, M.A. Harrison, ed., (Addison-Wesley), pp. 100-101 (1988).
Allen & Hamilton, How to Buy information with a First Virtual Account, Apr. 11, 1994, pp. 3-71.
American National Standard; "Financial Institution Retail Message Authentication"; ANSI X9.19; Aug. 13, 1986, pp. 1-38.
American National Standard; "Interchange Message Specification for Debit and Credit Card Message Exchange Among Financial Institutions"; ANSI X9.2; May 16, 1988, 105 pages.
Anderson, Ross ; "Why Cryptosystems Fail"; Proc. 1st Conf. Computer and Comm. Security; pp. 215-227; Nov. 1993.
Anderson, Ross J.; "UEPS—A Second Generation Electronic Wallet"; Proc. of the Second European Symposium on Research in Computer Security (ESORICS); Touluse, France; pp. 411-418, no date.
Andrade, et al, "Open On-Line Transaction Processing with the Tuxedo System," COMPCON Spring 1992, Feb. 1992, pp. 366-371.
Bank Administration Institute: "Payment Systems—United States", pp. 216-235, 1989.
Bellcore Internal E-Mail, Nov. 24, 1993.
Bender, M.; "The Basic Elements of EFTS: Electronic Funds Transfer Systems"; Kennikat Press; Port Washington, New York; pp. 43-46; 1975.
Berners-Lee, T., et al., http://www.ietf.org/rfc/rfc1738.txt?numbers=178, Dec. 1994, 24 pages.
Beutelspacher, et al, "Payment Applications with Multifunctional Smart Cards," Smart Card 2000: The Future of IC Cards, Oct. 1987, pp. 95-101.
Bina, E., et al., "Secure Access to Data Over the Internet," 1994 IEEE, pp. 99-102.
Bjorn N. Freeman-Benson, "Using the Web to Provide Private Information," First International Conference on the World Wide Web, WWW94, May 1994, 5 pages.
Bos et al.; "SmartCash: A Practical Electronic Payment System"; pp. 1-8; Aug. 1990.

Bowman, et al., "Univers: An Attribute-Based Name Server," Software Practice and Experience, vol. 20(4) 403-424 (Apr. 1990).
Burk et al.; "Value Exchange Systems Enabling Security and Unobservability"; Computers & Security, 9; pp. 715-721; 1990.
Burk, et al, "Digital Payment Systems Enabling Security and Observability," Computers & Security, 1989, pp. 399-415.
Case Study: The CIRRUS Banking Network; Commiunnications of the ACM, vol. 28, No. 3, Aug. 1985, pp. 797-798.
Catledge, L.D., "Characterizing Browsing Strategies in the World-Wide Web," http:www.igd.thg.de/archive/1995_.../UserPatterns.Paper4.formatted.htm, 12 pages.
CCITT Blue Book, vol. VIII; pp. 48-81, Nov. 14-25, 1988.
Chaum et al., "Achieving Electronic Privacy"; Scientific American; Aug. 1992, 8 pages.
Chaum et al.; "Untraceable Electronic Cash"; pp. 319-327; 1988, pp. 1-10.
Chaum, D.L. et al.; "Implementing Capability-Based Protection Using Encryption"; Electronics Research Laboratory, College of Engineering, University of California, Berkeley, California; Jul. 17, 1978.
Cheriton D.R., et al., "Uniform Access to Distributed Name Interpretation in the V-System," pp. 290-297, 4th International Conference on Distributed Computing System, IEEE Computer Society, San Francisco, CA, May 1984.
Choudhury, Abhijit K., et al., "Copyright Protection for Electronic Publishing Over Computer Networks," IEEE Network, The Magazine of Computer Communications, vol. 9, No. 3, pp. 12-20, May 1995.
Clickstream, Oct. 1996, The word Spy, [http:www.wordspy.com/words/clickstream.asp], 2 pages.
Cohen, Danny; "Computerized Commerce"; ISI Reprint Series IS/RS-89-243; Oct. 1989; Reprinted from Information Processing 89, Proceedings of the IFIP World Computer Congress, held Aug. 28-Sep. 1, 1989, p. 1095-1100.
Cohen, Danny; "Electronic Commerce"; University of Southern California Information Sciences Institute, Research Report ISI/RR-89-244; Oct. 1989, 41 pages.
Compuserve International; Compuserve Information Service Users Guide; pp. 109-113; 1986.
Computer and Business Equipment Manufacturers Association, "American National Standard for Information Systems-Database Language SQL" (N.Y., American National Standards Institute) pp. 27-28 (1986).
Computer Fraud & Security Bulletin, "Underlying Security Mechanisms," Mar. 1997.
Computer Shopper; "Internet for Profit"; pp. 180-182, 187, 190-192, 522-528, 532, 534; Nov. 1994.
Consumers Plugging Into New Electronic Mall, Advertising Age, Mar. 4, 1985. p. 74.
Curtis, R., et al., "Naming in Distributed Language Systems," pp. 298-302, 4th International Conference on Distributed Computing Systems, IEEE Computer Society, San Francisco, CA May 1984.
Damgard, "Payment Systems and Credential Mechanisms with Provable Security Against Abuse by Individuals," Advances in Cryptology—CRYPTO '88, 1988, pp. 328-325.
Davies, D.W. and Price, W.L.; "Security for Computer Networks: An Introduction to Data Security in Teleprocessing and Electronic Funds Transfer"; John Wiley & Sons; Dec. 5, 1985; pp. 304-336.
Droms, R.E., "Access to Heterogenous Directory Services," Proceedings IEEE INFOCOM '90, pp. 1054-1061, San Francisco, CA, Jun. 3-7, 1990.
Dukach, Semyon; "SNPP: A Simple Network Payment Protocol"; MIT Laboratory for Computer Science; Cambridge, Massachusetts; 1993, 7 pages.
Even et al.; "Electronic Wallet", Computer Science Department, Technion, Israel; pp. 383-386; 1983.
Farber, David, "Interesting-People Message—RSA/NCSA/EIT Announcement on Secure Mosiac" Palo Alto, California, Apr. 15, 1994, 4 pages.
Ferrarini, "Direct Connections for Software Selections," Business Computer Systems, Feb. 1984, pp. 35-38.

(56) References Cited

OTHER PUBLICATIONS

Fujioka, et al, "ESIGN: An Efficient Digital Signature Implementation for Smart Cards," Advances in Cryptology-Eurocrypt '91, Apr. 1991, pp. 446-457.
Gifford, David K.; "Cryptographic Sealing for Information Secrecy and Authentication"; Stanford University and Xerox Palo Alto Research Center; Communications of the ACM; vol. 25, No. 4; Apr. 1982; pp. 274-286.
Gifford, David; "Notes on Community Information Systems" MIT LCS TM-419; Dec. 1989.
Gligor, Virgil D. et al.; "Object Migration and Authentication"; IEEE Transactions of Software Engineering; vol. SE-5, No. 6; Nov. 1979, pp. 607-610.
Good, B., "Experience with Bank of America's Distributive Computing System," pp. 2-8, IEEE 1983.
Hakola, et al, "A System for Automatic Value Exchange," Proceedings—Fall Joint Computer Conference, 1966, pp. 579-589.
Harty et al.; "Case Study: The VISA Transaction Processing System"; May 30, 1988, pp. 1-23.
Hitchens, M., et al., "Bindings Between Names and Objects in a Persistent System," Proceedings of the 2nd International Workshop on Object Orientation in Operating Systems, IEEE Computer Society, pp. 26-37, Dourdan, FR, Sep. 1992.
Housel, B.C., et al., "SNA Distribution Services," IBM Systems Journal, pp. 319-343, vol. 22, No. 4, 1983.
HTTP State Management Mechanism, http://www.internic.net/rfc/rfc2109.txt (Jan. 9, 1998)—http://www.cse.ohio-state.edu/cgi-bin/rfc/rfc2965.html, Oct. 2000, 22 pages.
Information Network Institute, Carnegie Mellon University; Internet Billing Server; Prototype Scope Document; Oct. 14, 1993, 29 pages.
Inselberg, A., "An Approach to Successful Online Transaction Processing Applications," AFIPS Conference Proceedings, 1985 National Computer Conference, pp. 419-427, Chicago, IL, Jul. 15-18, 1985.
International Organization for Standardization; "International Standard: Bank Card Originated Messages—Interchange Message Specifications—Content for Financial Transactions".
Intuit Corp Quicken User's Guide; "Paying Bills Electronically"; pp. 171-192, no date.
Jansson, Lennart; "General Electronic Payment System"; 7th Proceedings of the International Conference on Computer Communication; pp. 832-836; 1985.
Kahan, Jose, "A capability-based authorization model for the World-Wide Web," http://www.igd.fhg.de/archive/1995_www95/proceedings/papers/86/CaMWWW.htlm, 1995; pp. 1-14.
Kahan, Jose, "A Distributed Authorization Model for WWW," http://www.isoc.org/HMP/PAPER/107/html/paper.html., May 5, 1995, pp. 1-16.
Kahan, Jose, "A New Authorization Model for Distributed Multimedia Information Consultation Systems," English Translation, pp. 1-21, undated.
Kahan, Jose, "Un nouveau modele d-autorisation pour les systemes de consultation d-information multimedia repartee," pp. 45-57, undated.
Kelley, A., and Pohl, I., "Arrays, Strings, and Pointers." In a Book on C, A. Apt, ed., (the Benjamin/Cummings Publishing Company, Inc., ) pp. 35-37 (1984).
Kenny, "EDI Security: Risks and Solutions," COMPSEC 1992; The Ninth World Conference on Computer Security, Audit, and Control, Nov. 1992, pp. 341-352.
Kent, Stephen T., "Internet Privacy Enhanced Mail", 8070 Communications of the ACM 36, New York, Aug. 1993, pp. 48-60.
Kernighan, Brian and Dennis M. Ritchie, "The C Programming Language" second edition, AT&T Bell Laboratories, (N.J., Prentice Hall) pp. 17-21 (1998).
Kiuchi, T., et al., "C-HTTP-The Development of a Secure, Closed HTTP-Based Network on the Internet," 1996 IEEE, pp. 64-75.

Knapskog, Privacy Protected Payments—Realization of a Protocol That Guarantees Payor Anonymity, Advances in Cryptology-Eurocrypt '88, May 1988, pp. 107-122.
Kohn, Dan, "Prior Art on Open Market Patents", e-mail message dated Mar. 9, 1998, 1 page.
Krajewski, M. et al.; "Applicability of Smart Cards to Network User Authentication"; Computing Systems; vol. 7, No. 1, 1994, pp. 75-89.
Krajewski, M.; "Concept for a Smart Card Kerberos"; 15th National Computer Security Conference; Oct. 1992.
Krajewski, M.; "Smart Card Augmentation of Kerberos"; Privacy and Security Research Group Workshop on Network and Distributed System Security; Feb. 1993.
Lai et al., "Endorsements, Licensing, and Insurance for Distributed System Services", Information Sciences Institute Univ. of Southern CA., Assoc. for Computing Machinery, 1994.
Lampson, B.W. et al., "Designing a Global Name Service,", Proceedings of the 5th Annual ACM Symposium on Principles of Distributed Computing, ACM, Calgary, Alberta, Canada, Aug. 1986, pp. 1-10.
Lewis, Peter H., "Attention Shoppers: Internet is Open", New York Times, Aug. 12, 1994, 2 pages.
Lim, Jong-Gyun, "Using Coollists to Index HTML Documents in the Web." http://www.ncsa.uiuc.edu/SDG/TT94/Proceedings/Searching/lim/coollist. htm, pp. 1-8, undated.
Low et al., "Anonymous Credit Cards", pp. 1-16, undated.
MaX.500-a Macintosh X.500 Directory Client, contents of WWW website, http://www.umich.edu/-dirsvcs/ldap/max500/index.htlm as of Jul. 7, 1997, 3 pages.
Medvinsky et al.; "Electronic Currency for the Internet"; Electronic Markets; pp. 30-31, Sep. 1993.
Medvinsky et al.; "NetCash: A Design for Practical Electronic Currency on the Internet"; Proc. 1st ACM Conf. on Comp. and Comm. Security; Nov. 1993, pp. 102-105.
Menefee, C., "New host for Internet Commercial Site Index," Newsbytes Nov. 9, 1994, p. 15.
Messmer, "NIST Stumbles on Proposal for Public Key Encryption," Network World, Jul. 27, 1992, pp. 1-6.
Metcalf, R.M., "Commercialization of the Internet Opens Gateways to Interpreneurs," InfoWorld, Aug. 8, 1994, p. 44.
Michalski, J., "Content in context: the Future of SGML and HTML," Release 1.0, Sep. 27, 1994, pp. 1-10.
Montulli, Lou, Electronic Mail to Multiple Recipients of the www-talk list (www-talk.1995q2/0134.html on "Session Tracking" (omi.mail.www-talk, Apr. 18, 1995), 3 pages.
Mosaic Communications Corp. press release; "Mosaic Communications Unveils Netwok Navigator and Server Software for the Internet"; Sep. 12, 1994.
National Westminster Bank Group; "Clearing House Automated Payments System"; pp. 1-29, no date.
NCSA HTTPd 1.5 Beta How to Redirect, "The New Redirect Directives", Last Modified Jul. 6, 1995, 2 pages.
Needham, Roger M., "Adding Capability Access to Conventional File Servers"; Xerox Palo Alto Research Center; Palo Alto, California; Jan. 1979, pp. 3-4.
Neuman, B. Clifford; "Proxy-Based Authorization and Accounting for Distributed Systems"; Proceedings of the International Conference on Distributed Computing Systems; May 25-28, 1993; Conf. 13; IEEE pp. 283-291.
Novick, Bob, (9503) Internet Marketing: The Clickstream, Mar. 1995, [http://www.i-m.com/archives/9503/0375.html], Mar. 20, 1995, 3 pages.
Notkin, D., "Proxies: A Software Structure for Accomodating Hetergeneity," Software-Practice and Experience, vol. 20(4), 357-364, Apr. 1990.
Ohmori et al., "An On-line Shopping System Protecting User's Privacy", Information Communication Laboratory of Matsushita Electric Industrial Co., Ltd. , Oct. 1994; pp. 25-32. Note: 12 Pages of Translation Attached.
Okamoto et al.; "Universal Electronic Cash"; NTT Laboratories, Japan, 1991, pp. 324-337.

(56) References Cited

OTHER PUBLICATIONS

Ordille, J.J., et al., "Nomenclater Descriptive Query Optimization for Large X.500 Environments," pp. 185-196, SIGCOM '91 Conference, Communication Architectures & Protocols, vol. 21, No. 4, Zurich, Switzerland, Sep. 1991.
Perry, "Electronic Banking Goes to Market," IEEE Spectrum, Feb. 1988, pp. 46-49.
Persistent Client State HTTP Cookies, http://search.netscape.com/newsref/std/cookie_spec.html (Jan. 9, 1998); 4 pages.
Peterson, Larry L., "A Yellow-Pages Service for a Local-Area Network," ACM Proceedings of the ACM SIGCOMM 87 Workshop, ACM Press, 1988, pp. 235-242.
Pfitzmann et al.; "How to Break and Repair a 'Provably Secure' Untraceable Payment System"; pp. 338-350; 1991.
Ph. van Heurck, "TRASEC: Belgian Security System for Electronic Funds Transfers," Computers & Security, 1987, pp. 261-268.
Pitkow, J.E. et al., "Webviz: A Tool for World-Wide Web Access Log Analysis." First International World Wide Web Conf., May 1994, 7 pages.
Pitkow, J.E., and Recker, M.M., Using the Web as a Survey Tool: Results from Second WWW User Survey,: http://www.igd.fhg.de/archive/1995_www95/papers/79/survey/survey_2_paper .html.
Pongratz, et al, "IC Cards in Videotex Systems," Smart Card 2000, 1989, pp. 179-186.
Rafael Hirschfeld, "Making Electronic Refunds Safer"; Sections 1, 2, 4 and 6, 1992.
Ramanathan, Sirvivas, et al., "Architectures for Personalized Multimedia," IEEE Multimedia, vol. 1, No. 1, Computer Society, pp. 37-46, 1994.
P. Remeery et al., "Le Paiement electronique", L'Echo des RECHERCHES, No. 134, 1988, pp. 15-24.
Rescorla, E., et al., "The Secure HyperText Transfer Protocol"; Aug. 1999, 43 pages.
Rivest, R., "The MD5 Message-Digest Algorithm," MIT Laboratory for Computer Science and RSA Data Security, Inc., Apr. 1992, 20 pages.
Rivest, R.L. et al., "A Method for Obtaining Digital Signatures and Public-Key Cryptosystems," Laboratory for Computer Science, Massachusetts Institute of Technology, Cambridge, Massachusetts, Rev. Sep. 1, 1977, pp. 1-15.
Schaefer et al., "Networked Information Discovery and Retrieval Tools: Security Capabilities and Needs", The MITRE Corporation, 1994, pp. 145-153.
Schamuller-Bichl, I.; "IC-Cards in High-Security Applications"; Voest-Alpine AG, Linz, pp. 177-199; 1991.
Schwartz, et al., "A Name Service for Evolving, Heterogeneous Systems," Proceedings of the 11th ACM Symposium on Operating Systems Principles, vol. 21, No. 5, pp. 52-62, Austin, TX, Nov. 1987.
Schwartz, M.F., et al., Experience with a Semantically Cognizant Internet White Pages Directory Tool, Journal of Internetworking: Research and Experience, pp. 1-22 (1990).
Sedayao, J., "Mosaic Will Kill My Network!—Studying Network Traffic Patterns of Mosaic Use", http://www.ncsa.uiuc.edu/SDG/TT94/P...gs/DDay/sedayao/mos_traf_paper.htm, undated, 7 pages.
Shain, "Security in Electronic Funds Transfer System: Message Integrity in Money Transfer and Bond Settlements through GE Information Services' Global Network," Computers & Security, 1989, pp. 209-221.
Sheltzer, et al., "Name Service Locality and Cache Design in a Distributed Operating System," University of California, Los Angeles, undated, 8 pages.
Sirbu, Marvin A.; "Internet Billing Service Design and Prototype Implementation"; An Internet Billing Server; pp. 1-19; 1993.
Society for Worldwide Interbank Financial Telecommunications S.C.; "A S.W.I.F.T. Overview", no date, 34 pages.
Squillante, M.C., et al., Integrating Heteregeneous Local Mail Systems, pp. 59-67, IEEE Software, Nov. 1989.
Staskauskas, "The Formal Specification and Design of a Distributed Electronic Funds Transfer System," IEEE Transactions on Computers, Dec. 1988, pp. 1515-1528.
Stol, Privacy Protected Payments—A Possible Structure for a Real Implementation and Some Resource Considerations, Feb. 1998, pp. 1-83.
Strazewski, "Computerized Service Sets Shoppers Hacking," Advertising Age, Feb. 22, 1988, p. 62.
Takei, "Videotex Information System and Credit System Connecting with MARS-301 of JNR," Japanese Railway Engineering, No. 95, Sep. 1985, pp. 9-11.
Tanaka, et al, "Untraceable Electronic Funds Transfer System," Electronics and Communications in Japan, 1989, pp. 47-54.
Tenenbaum, Jay M. and Schiffman, Allan M.; "Development of Network Infrastructure and Services for Rapid Acquisition"; adapted from a white paper submitted to DARPA by MCC in collaboration with EIT and ISI, Jan. 2, 1992, 19 pages.
Terry, D.B., "Structure-free Name Management for Evolving Distributed Envrivonments," pp. 502-508, 6th International Conference on Distributed Computing Systems, IEEE Computer Society, Cambridge, MA, May 1986.
Tunstall, "Electronic Currency," Smart Card 2000: The future of IC Cards, Oct. 1987, pp. 47-48.
Vittal, J. "Active Message Processing: Messages as Messengers"; pp. 175-195; 1981.
Voydock V., et al., "Security Mechanisms in High Level Network Protocols," Computing Surveys, vol. 15, No. 2, Jun. 1983, pp. 135-171.
Waidner, et al, "Loss-Tolerance for Electronic Wallets," Fault-Tolerant Computing: 20th International Symposium, Jun. 1990, pp. 140-147.
Weber, "Controls in Electronic Funds Transfer System," Computers & Security, 1989, pp. 123-137.
Welch, B., et al., "Prefix Tables: A Simple Mechanism for Locating Files in a Distributed System," pp. 184-189, 6th International Conference on Distributed Computing Systems, IEEE Computer Society, Cambridge, MA, May 1996, pp. 184-189.
Welz, Gary, "The Media Business on the WWW", Proceedings of the Second World Wide Web Conference 1994: Mosaic and the Web, Oct. 1994, 6 pages.
Williams, "Debit Program Cuts Fraud; CompuServe Plan a Success," Pensions & Investment Age, Feb. 4, 1985, pp. 21-32.
WordPerfect for Macintosh, pp. 153-162 (1990).
Zatti, et al., "Naming and Registration for IBM Distributed Systems," IBM Systems Journal, pp. 353-380, vol. 31, No. 2, 1992.
Rescorla E., et al., "The Secure HyperText Transfer Protocol", Enterprise Integration Technologies, Dec. 1994, 35 pages.
Rescorla, E., et al., "The Secure HyperText Transfer Protocol," Aug. 1999.
Viescas, "Official Guide to the Prodigy Service" 1991, pp. 1-290.
Amazon, "Welcome First Time Visitors" Jun. 29, 1998, pp. 1-4.
Anderson, Scott et al., "Sessioneer: Flexible Level Authentification with Off the Shelf Servers and Clients," http://www.igd.fhg.de/archive/1995_www95/papers/77/sessioneer2.html, pp. 1-7.
"Announcing: Internet Shopkeeper" (Aug. 2, 1994) posting on comp.infosystems.www and misc.forsale.
Archive of WWWorder mailing list (May 31, 1994-Jun. 28, 1994).
Aronson, Dan, "access and session control" posting to www-talk discussion list (Sep. 14, 1994) available at: http://1997.webhistory.org/www.lists/www-talk.1994q3/0901.html.
Aronson, Dan, et al., Electronic Mail to multiple recipients of the www-talk list (www-talk©info.cern.ch) on "Access and session control" dated Sep. 14, 1994.
alain@hyperman.co.il, "Identifying Mosaic session" posting to www-talk discussion list (Dec. 20, 1994) available at http://1997.webhistory.org/www.lists/www-talk.1994q4/1098.html.
Arnett, Nick "Statelessness" posting to www-talk discussion list (May 16, 1994) available at: http://1997.webhistory.org/www.lists/www-talk.1994q2/0562.html.
Batelaan; Butler; Chan; Chen; Evenchick; Hughes; Jen; Jeng; Millett; Riccio; Skoudis; Starace; Stoddard; "An Internet Billing Server Prototype Design"; Carnegie Mellon University; Aug. 10, 1992, 97 pages.

(56) References Cited

OTHER PUBLICATIONS

Berners-Lee, T., RFC 1630: Universal Resource Identifiers in WWW: A Unifying Syntax for the Expression of Names and Addresses of Objects on the Network as used in the World-Wide Web, Jun. 1994, 23 pages.
Berners-Lee, T., et al. RFC 1945: Hypertext Transfer Protocol—HTTP/1.0, May 1996, 48 pages.
Berners-Lee, T. "draft-ietf-iiir-http-00.txt" (Nov. 5, 1993), 28 pages.
Bieber, Michael, "Issues in Modeling a 'Dynamic' Hypertext Interface for Non-Hypertext Systems", Dec. 1991, pp. 203-217.
Biznet Technologies "What is (VVV)? Versatile Virtual Vending", published at http://www.bnt.com (Sep. 12, 1994), 3 pages.
Buhle, Jr., E. Loren, "Wide Area Info Services," Digital Systems Journal, Sep.-Oct. 1994, p. 13-16.
Business Wire, "CommerceNet Urges Government to Ease Export Restrictions on Encryption Products; Consortium's New White Paper Articulates Position on the Export of Cryptography Based Products", Jun. 26, 1995, 2 pages.
Changes to wwwStat at http://ftp.ics.uci.edu/pub/websoft/wwwstat/Changes, (copyright 1994, 1996), 4 pages.
Compuserve Manual (undated), 12 pages.
Comer, D.E., et al., "A Model of Name Resolution in Distributed Systems," pp. 523-530, 6th International Conference on Distributed Computing Systems, IEEE Comp. Society, Cambridge NH, May 1986.
Comer, D.E., et al., "The TILDE File Naming Scheme", Department of Computer Sciences, W. Lafayette, Indiana, 1986. pp. 509-514.
Cookies and Privacy FAQ, http://search.netscape.com/assist/security/fags/cookies.html Jan. 9, 1998 at 4:20 p.m, 3 pages.
"Cookies.txt" internet postings to comp.infosystems.www.users discussion list re: Mosaic Netscape (Dec. 23, 1994-Dec. 27, 1994) available at: http://groups.google.com/group/comp.infosystems.www.users/browse_thread/thread/613e81948e9cf6e4/134ade72dfc1c58d?Ink=st&rnum=2&hl=en#134ade72dfc1c58d.
Crocker, Glenn, "web2mush: Serving Interactive Resources to the Web," Electronic Proc. of the 2nd World Wide Web Conf. '94: Mosaic and the Web!, Developers Day, (Oct. 20, 1994), pp. 1-8.
Derler, Christian, "The World-Wide Web Gateway to Hyper-G: Using a Connectionless Protocol to Access Session-Oriented Services", Institut für Informationsverarbeitung and Computergestützte neue Medien, Graz, Austria, dated Mar. 1995, 105 pages.
Dukach, Semyon, "SNPP: A Simple Network Payment Protocol" (Prototype Implementation—Submitted in Partial Fulfillment of Degree Requirements), Oct. 7, 1992.
EAASY SABRE User's Guide and EAASY SABRE Reference Guide, undated, pp. 1-43.
English, Joe, "Re: Identifying Mosaic session", posting to www-talk discussion list (Dec. 20, 1994 available at: http://1997.webhistory.org/www.lists/www-talk.1994q4/1109.html.
Ferrarini, E., "Flight of Fancy: Goodbye Travel Agent", Business Computer Systems, vol. 2, No. 11, pp. 39-40, Nov. 1993.
Fielding, R., RFC 1808: Relative Uniform Resource Locators, Jun. 1995, p. 1-13.
Fielding, Roy, software distribution archive for the HTTP log file analysis program, wwwstat v1.01, dated Apr. 24, 1994, published at http://www.ics.uci.edu/WebSoft/wwwstat/.
Fielding, R., et al. RFC 2068: Hypertext Transfer Protocol—HTTP/1.1, Jan. 1997, 127 pages.
Fielding, R., et al. RFC 2616: Hypertext Transfer Protocol—HTTP1/1, Jun. 1999, 140 pages.
Fielding, Roy, et al., "Principled Design of the Modern Web Architecture" ACM Transactions on Internet Technology 2, 2 pp. 115-150 (May 2002).
Foster, David & Stuart Finn, "Insurers Can Benefit From E-Mail Networks", National Underwriter Property & Casualty-Risk & Benefits Management, No. 9, p. 46(2), Mar. 4, 1991.
Gifford, Stewart, Payne, Treese, "Payment Switches for Open Networks," presented at 40th IEEE, IEEE, COMPCON '95, Mar. 5-9, 1995, San Francisco, CA.
"Here it is, World" internet postings to comp.infosystems.www.users discussion list re: Mosaic Netscape (Oct. 13, 1994-Oct. 17, 1994) available at: http://groups.google.com/group/comp.infosystems.www.users/browse_thread/thread/3666fe4e21b3a9e2/9a210e5f72278328?ink=st&rnum=5&hl=en#9a210e5f72278328.
"How to get statefull HTML documents" internet postings to comp.infosystems.www.misc discussion list (Jun. 24, 1994-Jun. 25, 1994) available at: http://groups.google.com/group/comp.infosystems.www.misc/browse_thread/thread/fd304fedb645529a/b8f6dab2aa73ae71?Ink=st&rnum=7&hl=en#b8f6dab2aa73ae71.
"How to add state info to a form" internet postings to comp.infosystems.www.providers discussion list (Jun. 30, 1994-Jul. 1, 1994) available at: http://groups.google.com/group/comp.infosystems.www.providers/browse_thread/thread/2acad6cdc8ebb8a/bf368e630add2c94?Ink=st&rnum=8&hl=en#bf368e630add2c94.
Hall, Devra, et al., "Build a Web Site: The Programmer's Guide to Creating, Building, and Maintaining a Web Presence", published Apr. 1995. ISBN 0-7615-0064-2, 715 pages.
Hallam-Baker, Phillip, "Statelessness" posting to www-talk discussion list (May 30, 1994) available at: http://1997.webhistory.org/www.lists/www-talk.1994q2/0705.html, 1 page.
Hughes, Kevin, source code file for the HTTP log file analysis program, getstats v1.0, dated Feb. 1, 1994, published at http://eit.com/software/getstats/getstats.html.—Version 1, 64 pages.
Hughes, Kevin, source code file for the HTTP log file analysis program, getstats v1.0, dated Feb. 1, 1994, published at http://eit.com/software/getstats/getstats.html—Version 2, 64 pages.
"It 'Will' Happen", article excerpt from infoHighway, vol. 2-1, 1994, 2 pages.
McBeath, Jim, Statelessness posting to www-talk discussion list (May 27, 1994) available at: http://1997.webhistory.org/www.lists/www-talk.1994q2/0683.html.
McCartney, Todd, Message posted to Usenet public discussion group, rec.arts.disney, dated Nov. 21, 1994, 1 page.
Maren, Michael, "The Age of E-Mail," Home Office Computing, vol. 11, No. 12, p. 63(5), Dec. 1993.
Majewski, Steven, "Identifying Mosaic session" posting to www-talk discussion list (Dec. 20, 1994) available at: http://1997.webhistory.org/www.lists/www-talk.1994q4/1111.html.
"Netscape 0.93 Setup Questions" internet postings to comp.infosystems.www.misc discussion list re: Mosaic Netscape (Nov. 21, 1994-Nov. 25, 1994) available at: http://groups.google.com/group/comp.infosystems.www.misc/browse_thread/thread/da4e82efc6512f67/8dabc347291409d5?Ink=st&rnum=1&hl=en#8dabc347291409d5.
"Netscape and Cookies" internet postings to comp.infosystems.www.users discussion list re: Mosaic Netscape (Dec. 11, 1994-Dec. 13, 1994) available at: http://groups.google.com/group/comp.infosystems.www.users/browse_thread/thread/5347cb89bbae572b/3583cab5e6c13e94?Ink=st&rnum=3&hl=en#3583cab5e6c13e94.
NCSA HTTPd release notes at http://hoohoo.ncsa.uiuc.edu/docs/Upgrade.html (last updated Aug. 1, 1995), 11 pages.
Net Market ("Numerous News Media Stories") New York Times; front page of Business Section; Aug. 12, 1994, 4 pages.
The NetMarket Company, NetMarket PGP Help file, from http://www.netmarket.com, dated Dec. 10, 1994, 3 pages.
Nielson, Jacob, "Hypertext & Hypermedia", Technical University of Denmark, Copenhagen, Denmark, Academic Press, (Copyright 1990), 24 pages.
O'Mahony, Donal, Michael Peirce, & Hitesh Tewari, "Electronic Payment Systems", Artech House, Inc., pp. 145-155, Jan. 1997.
Poler, Ariel, "Improving WWW Marketing Through User Information and Non-Instrustive Communications", I/PRO 2nd WWW Conference, Chicago, IL (Oct. 1994) (Presentation).
Pitkow, et al., "Results from the First World Wide Web Use Survey", presented at the First International Conference on the World Wide Web, Geneva, Switzerland, May 25-27, 1994, published at http://www94.web.cern.ch/WWW94/PrelimProcs.html on Jun. 2, 1994, and reprinted in the Journal of Computer Networks and ISDN Systems, vol. 27, No. 2., Nov. 1994, Elsevier Science B.V., 15 pages.

(56) References Cited

OTHER PUBLICATIONS

Rhine, Jared, "Statelessness" posting to www-talk discussion list (May 16, 1994) available at: http://1997.webhistory.org/www.lists/www-talk.1994q2/0563.html.
Smithson, Brain, and Singer, Barbara, An Information Clearinghouse Server for Industry Consortia, 2nd Int'l Conf. On the World Wide Web, Chicago, Ill., Oct. 1994.
Spero, Simon, "Statelessness" posting to www-talk discussion list (May 17, 1994) available at: http://1997.webhistory.org/www.lists/www-talk.1994q2/0579.html.
Stallings, William, Data & Computer Communications, MacMillan Publishing, 1985, pp. 245-252.
"Transactional Services on WWW" internet postings to comp.infosystems.www discussion list (May 12, 1994-Jun. 1, 1994) available at: http://groups.google.com/group/comp.infosystems.www/browse_thread/thread/bf430e6df8e6e7d/8ed77a97f5d0b9d6?lnk=st&hl=en#8ed77a97f5d0b9d6.
The Major News: Collection of Information and Advertisements concerning BBS (including information regarding Galacticomm), Fall 1993.
Trewitt, Glenn, "Using Tel to Process HTML Forms", Digital Equipment Corporation, Network Systems Laboratory TN-14.
Trip et al., "Cookies" (client-side persistent information) and their use, Netscape Technical Note 20019, Netscape Communications Corp., Oct. 1995.
Troth, Rick, "access and session control" (Sep. 15, 1994) available at: http://1997.webhistory.org/www.lists/www-talk.1994q3/0923.html.
"What's New," http://archive.ncsa.uiuc.edu/SDG/Software/Mosaic/Docs/old-whats-new/whats-new-0294.html.
wwwStat Readme file at http://ftp.ics.uci.edu/pub/websoft/ww-wstat/README, Copyright 1994, 1996 Regents of the University of California, 1 page.
Leggett, John et al., "Hyperform: Using Extensibility to Develop Dynamic, Open and Distributed Hypertext Systems", 1992, pp. 251-261.
European Search Report dated Jun. 19, 2006.
Complaint for Patent Infringement filed Jan. 12, 2004.
Amazon.com's Answer, Affirmative Defenses, and Counterclaims to Soverain Software's Complaint filed Mar. 9, 2004.
Amazon.com's Response to Plaintiff's First Set of Interrogatories filed Jun. 11, 2004.
Soverain's Responses and Objections to Amazon.com's First Set of Interrogatories (Nos. 1-14) filed Jun. 11, 2004.
Disclosure of Preliminary Invalidity Contentions by Defendants Amazon.com and the Gap (with Exhibit A) filed Jul. 6, 2004.
Amazon's Motion for Partial Summary Judgment of Non-Infringement ('780 Patent), and Memorandum in Support Thereof filed Jul. 15, 2004.
Supplemental Disclosure of Preliminary Invalidity Contentions by Defendants Amazon.com and the Gap (with Exhibit A) filed Jul. 26, 2004.
Soverain's Supplemental Responses to Amazon.com's First Set of Interrogatories (Nos. 1-14) filed Aug. 13, 2004.
Soverain's Second Supplemental Response to Amazon.com's First Set of Interrogatories (Nos. 1-14) filed Sep. 21, 2004.
Soverain's Third Supplemental Response to Amazon.com's First Set of Interrogatories (Nos. 1-14) Sep. 2004.
Soverain 's Opposition to Defendant Amazon.com's Motion for Partial Summary Judgement of Non-Infringement ('780 Patent) and Supporting Memorandum; Declaration of Jack Grimes (Aug. 6, 2004).
Amazon.com's Reply in Support of its Motion for Partial Summary Judgment of Non-Infringement ('780 Patent) filed Aug. 20, 2004; Declaration of John Vandenberg (Aug. 19, 2004).
Soverain's Surreply to Amazon.com's Motion for Partial Summary Judgment of Non-Infringement ('780 Patent) filed Aug. 23, 2004 and Supplemental Declaration of Jack D. Grimes Ph.D. filed Aug. 23, 2004.
Soverain's Preliminary Claim Construction (Patent Local Rule 4-2) filed Sep. 2, 2004.
Joint Disclosure of Prelminary Claim Construction and Extrinsic Evidence by Defendants Amazon.com and the Gap (with Exhibits A-B) filed Sep. 2, 2004.
Joint Claim Construction and Prehearing Statement (Patent Local Rule 4-3) (with Exhibits A-D) filed Oct. 4, 2004.
Amazon.com's First Amended Answer, Affirmative Defenses, and Counterclaims to Soverain's Complaint filed Oct. 6, 2004.
Declaration of Jack D. Grimes Ph.D., dated Nov. 15, 2004.
Soverain's Claim Construction Brief Pursuant to Patent Rule 4-5(a) dated Nov. 16, 2004.
Declaration of Dr. Richard N. Taylor in Support of Defendants' Markman Brief dated Nov. 29, 2004.
Joint Claim Construction Brief of Amazon.com and Gap dated Nov. 30, 2004.
Soverain's Claim Construction Reply Brief Pusuant to Patent Rule 4-5(c) dated Dec. 7, 2004.
Joint Claim Construction Chart (Patent Local Rule 4-5D), filed Dec. 27, 2004 with Appendix A.
Order Denying Amazon's Motion to Stay Proceedings Pending Completion of the Reexamination, Apr. 25, 2005.
Transcript of the Markmam Hearing Before the Honorable Leonard David United States District Judge, Jan. 6, 2005.
Soverain's Disclosure of Asserted Claims and Preliminary Infringement Contentions dated Jun. 3, 2004.
Deposition of G. Winfield Treese, dated Oct. 27, 2004.
Soverain's Reply to Amazon.Com's Amended Counterclaims, dated Jan. 14, 2005.
Third Supplement to Defendant Amazon's Initial Disclosures, dated Mar. 4, 2005.
VideoTaped Deposition of Thomas Mark Levergood dated Mar. 8, 2005 (2 parts).
VideoTaped Deposition of Andrew C. Payne dated Mar. 11, 2005.
VideoTaped Deposition of Stephen Jeffrey Morris dated Mar. 9, 2005.
Deposition of Glenn M. Trewitt (with Exhibits) dated Jan. 25, 2005 (2 parts).
Soverain's Fourth Supplemental Responses to Amazon's First Set of Interrogatores (Nos. 1-14) dated Mar. 21, 2005.
Soverain's Responses to Interrogatory Nos. 22, 23, 26 and 36 of Amazon's Third Set of Interrogatores (Nos. 17-28) dated Mar. 21, 2005.
Soverain's Responses to Amazon's First Set of Requests for Admission to Plaintiff Soverain Software (Nos. 1-100) dated Mar. 21, 2005.
Memorandum Opinion with Appendix A and B, dated Apr. 7, 2005.
Soverain's Reply to Amazon.com's Third Amended Counterclaims, filed Mar. 17, 2005.
Amazon's Notice of Rejection Of Claims 1-45 Of U.S. Pat. No. 5,708,780 (Attachments: # 1 Exhibit A)(McLeod, Richard), filed Mar. 25, 2005.
Amazon's Renewed Motion to Stay Proceedings until the Patent and Trademark Office Completes Re-Examination of The Three Patents-in-Suit with Exhibits 1-5, filed Apr. 5, 2005.
Soverain's Opposition to Amazon's Renewed Motion to Stay, filed Apr. 20, 2005.
Amazon.com's Reply in Support of Renewed Motion to Stay, filed Apr. 25, 2005.
Soverain's Surreply in Opposition to Amazon's Renewed Motion to Stay, filed Apr. 26, 2005.
Deposition of Glenn Arthur Hauman with Exhibits (Oct. 28, 2004).
Videotaped Deposition of Glenn Crocker with Exhibits (Mar. 10, 2005).
Videotaped Deposition of Guy Henry Timothy Haskin with Exhbits (Mar. 18, 2005).
Deposition of Joshua Smith with Exhibits (Mar. 2, 2005).
Videotaped Deposition of Kevin Ming-Wei Kadaja Hughes with Exhibits (Mar. 21, 2005).
Videotaped Deposition of Michael Kuniaysky (Feb. 22, 2005) with Exhibits.
Videotaped Deposition of Michael Lazzaro with Exhibits (Mar. 9, 2005).

(56) References Cited

OTHER PUBLICATIONS

Videotaped Deposition of Phillip Hallam-Baker with Exhibits (Mar. 11, 2005).
Videotaped Deposition of Robert Allen Olson with Exhibits (Mar. 3, 2005).
Deposition of Thomas Soulanille with Exhibits (Mar. 14, 2005).
Expert Report of Alexander B. Trevor (Apr. 10, 2005).
Defendant Amazon.com Inc.'s Unopposed Motion for Leave to Amend its Answer to Include Allegations Regarding Stuff.com, filed May 18, 2005.
Declaration of James E. Geringer in Support of Amazon.com, Inc's Motion for Leave to Amend its Answer and Counterclaims to Add Stuff.com, filed May 18, 2005.
Exhibit 1 of Geringer Declaration: Excerpts of Deposition of Michael Kuniaysky, filed May 18, 2005.
Exhibit 2 of Geringer Declaration: E-mail from Brooks Cutter to Mike Kuniaysky, filed May 18, 2005.
Exhibit 3 of Geringer Declaration: Excerpts of Deposition of Richard Boake, filed May 18, 2005.
Exhibit 5 of Geringer Declaration: Excerpts of Deposition of Andrew Payne, filed May 18, 2005.
Exhibit 6 of Geringer Declaration: E-mail from Andrew Payne to Winfield Treese, et al., filed May 18, 2005.
Exhibit 7 of Geringer Declaration: Excerpts of Deposition of Winfield Treese, filed May 18, 2005.
Exhibit 8 of Geringer Declaration: Amazon.com, Inc.'s [Proposed] fourth Amended Answer, Affirmative Defenses, and Counterclaims to Soverain Software, LLC's Complaint (Redlined Version), filed May 18, 2005.
Amazon.com's Motion for Partial Summary Judgment that '314 claims 34-39, '492 claims 17-18 and 35-36, and '780 claims 1, 4, and 22-24 are invalid under 35 U.S.C. 102, filed Jun. 10, 2005.
Amazon.com's Motion for Partial Summary Judgment that claims are indefinite under 35 U.S.C. 112, filed Jun. 10, 2005.
*Soverain Software LLC* v. *Amazon.Com, Inc. and The Gap, Inc.*, Form of Stipulated Request for Final Dismissals of the Actions, filed Aug. 30, 2005.
*Soverain Software LLC* v. *Amazon.Com, Inc. and The Gap, Inc.*, Order of Dismissal with Prejudice filed Aug. 31, 2005.
Andrews, K. et al., "Soaring through Hyperspace: A Snapshot of Hyper-G and its Harmony Client", Proc. of Europgraphics Symposium and Workshop on Multimedia; Multimedia/Hypermedia in Open Distributed Environments, Graz, Austria, Jun. 1994.
Andrews, et al., "Hyber-G: A Distributed Hypermedia System of the Second Generation", IICM, Graz University of Technology, Austria, pp. 2-15.
Kappe, F. et al., "Hyper-G: A New Tool for Distributed Hypermedia", IIG Technical Report No. 388, IIG, Graz University of Technology, Austria, May 1993.
Kappe, F., "Hyper-G: A Distributed Hypermedia System" in Leiner B. (editor): Proc. INET '93, San Francisco, California, pp. DCC-1-DCC-9, Internet Society, Aug. 1993.
*Soverain Software* v. *Amazon*, Disclosure of Final Invalidity Contentions by Defendant Amazon (6:04-CV-14), with Exhibit A, Prior Art Analysis, and Final Invalidity Contentions, dated Jun. 1, 2005.
Ex Parte Reexamination of U.S. Pat. No. 5,708,780 (Control No. 90/007,183), Reexamination Certificate Issued; Mar. 15, 2006.
Ex Parte Reexamination of U.S. Pat. No. 7,272,639 (Control No. 90/011,444), Reexamination Certificate Issued; Sep. 29, 2011.
Ex Parte Reexamination of U.S. Pat. No. 7,272,639 (Control No. 90/011,937), Response after Non-Final Action Entered; May 2, 2012.
Declaration of Bjorn Freeman-Benson in Support of Defendants' Motion for Summary Judgment that the Patents in Suit are Invalid, *Tumbleweed Communications* v. *Paypal Inc. and eBay*, US District Court of Northern District of California, Case No. C02-02212 CW, filed Jun. 20, 2003, 5 pages with Exhibits A-C.

Defendant Tigerdirect's Answer, Affirmative Defenses and Counterclaims to Plaintiff's Amended Complaint for Patent Infringement (Case 6:07-cv-00511-LED-Document 129), filed Jul. 21, 2008 (20 pages).
Defendant Systemax's Answer, Affirmative Defenses and Counterclaims to Plaintiff's Amended Complaint for Patent Infringement Case 6:07-cv-00511-LED-Document 130), filed Jul. 21, 2008 (20 pages).
*Soverain Software* v. *CDW Corporation, et al.*, (Case 6:07-cv-00511-LED-Document 131) Notice of Compliance-TigerDirect, filed Jul. 21, 2008 (5 pages).
*Soverain Software* v. *CDW Corporation, et al.*, (Case 6:07-cv-00511-LED-Document 132) Notice of Compliance-Systemax, filed Jul. 21, 2008 (5 pages).
Systemax/TigerDirect's Invalidity Basis Pursuant to 35 USC Sec. 112 Paragraphs (1) and (2); Civil Action No. 6:07-cv 5 11 (LED), filed Jul. 21, 2008 (22 pages).
Systemax/TigerDirect's Preliminary Invalidity Contentions for Asserted Claims of U.S. Pat. No. 5,715,314 and U.S. Pat. No. 5,909,492—"Shopping Cart" Functionality, Civil Action No. 6:07-cv 5 11 (LED), filed Jul. 21, 2008 (39 pages).
Systemax/TigerDirect's Preliminary Invalidity Contentions for Asserted Claims of U.S. Pat. No. 5,909,492—"SmartStatement" Functionality, Civil Action No. 6:07-Civil Action No. 6:07-cv 5 11 (LED), filed Jul. 21, 2008 (38 pages).
Systemax/TigerDirect's Preliminary Invalidity Contentions for Asserted Claims of U.S. Pat. No. 7,272,639, Civil Action No. 6:07-cv 5 11 (LED), filed Jul. 21, 2008 (108 pages).
Files.Doc-List of Files and Their Meanings for Ktshopper 2.31, 2 pages, undated.
Google Groups, Dec's Digital Store Now on the Internet "bit.listserv.dectei-I", Jan. 5, 1994, 13 pages.
Google Groups, Decnews for UNIX, Issue #16, "biz.dec", Feb. 16, 1994, 4 pages.
Google Groups, Product Release "comp.bbs.tbbs", Aug. 6, 1994, 6 pages.
Google Groups, Looking for an "order Entry" Program, "comp.bbs.tbbs", Aug. 25, 1994, 1 page.
WWW94-Preliminary Proceedings, "List of PostScript Files for the WWW94 Advance Proceedings", Jun. 2, 1994, 7 pages.
Bellare, et al., "Entity Authentication and Key Distribution", Aug. 1993, 29 pages.
Burchard, Paul, "Announcing W3Kit: A toolkit for Interactive Web Application Development", www-talk Jan.-Mar. 1994, Feb. 25, 1994, 1 page.
Burchard, Paul, "Re: Statelessness", www-talk Apr.-Jun. 1994, May 16, 1994, 1 page.
Burchard, Paul, "Re: Server Control Over History", www-talk Jan.-Mar. 1994, Feb. 15, 1994, 2 pages.
Burchard, Paul, "W3 Application", Apr. 18, 1994, 2 pages.
Burchard, Paul, "How W3Kit Works", Apr. 18, 1994, 3 pages.
Carey, Theresa W., "Quicken 2.0 for Windows: Improving a Good Thing", Windows Sources, vol. 1, Feb. 1993, 3 pages.
CompuServe Information Service, Users Guide, 1986 CompuServe Incorporated, 7 pages.
Detweiler, L., "IETF + PEM = Internet Commerce", Sep. 9, 1993, 2 pages.
Devetzis et al., "July IETF: Internet Mercantile Protocols BOF", Jul. 14, 1993, 3 pages.
Devetzis/Bellcore, Minutes of the Internet Mercantile Protocols BOF (IMP), undated, 7 pages.
"Digital Equipment Corporation Announces Version 2.0 of Its Electronic Store", News Release, Feb. 17, 1989, Maynard, MA, 3 pages.
Estrin et al. "Visa Protocols for Controlling Inter-Organizational Datagram Flow: Extended Description", WRL Research Report 88/5, Palo Alto, CA, Dec. 1988, 34 pages.
Gettys, et al., "The X Window System, Version 11", Software-Practice and Experience, vol. 20, Oct. 1990, 67 pages.
Gray et al., "Transaction Processing: Concepts and Techniques", Morgan Kaufmann Publishers, San Francisco, California, 1993, 937 pages.

(56) References Cited

OTHER PUBLICATIONS

Higgens, Steve, "For Advertisers, Tapping Into On-Line Services is Harder Than it Looks", Published in Investor's Business Daily, Apr. 7, 1994, 3 pages.
"HTML+(Hypertext Markup Format)",Nov. 2, 1993, 60 pages.
Hostetler et al., "[Proposed] HTTP Working Group" Internet Draft, Mar. 10, 1995, 6 pages.
Ibrahim, Bertrand, "World-Wide Algorithm Animation", Computer Science Department, University of Geneva, Switzerland (undated), 12 pages.
Kelsey Technologies and Mark P. Cirmotich, "KTShopper—the OnLine Shopping Center" Version 2.31, Kelsey Technologies, Sep. 23, 1992, 22 pages.
Levergood et al., "AudioFile: A Network-Transparent System for Distributed Audio Applications", Digital Equipment Corporation, Cambridge Research Laboratory, Technical Report Series, Jun. 11, 1993, 280 pages.
Levergood et al., "AudioFile: A Network-Transparent System for Distributed Audio Applications", Digital Equipment Corporation, Cambridge Research Lab, Jun. 11, 1993, 100 pgs.
Levergood et al., "AudioFile: A Network-Transparent System for Distributed Audio Applications", Digital Equipment Corporation, Cambridge Research Lab, [originally published in the Proceedings of the USENIX Summer 1993 Technical Conference, Cincinnatl, Ohlo, Jun. 21-25, 1993, 25 pages.
Mann, Richard, "How to Choose and Use Personal-Finance Software", Compute! Issue 151, Apr. 1993, 4 pages.
Mathog, David, "GCG on DEC AXP Info", e-mail posted at http://www.bio.net/bionet/hypermail/info-gcg/1994-May/000581. html, May 16, 1994, 3 pages.
Montulli, Lou, "Re: Session Tracking", e-mail posted at http://1997.webhistory.org/www.lists/www-lists/www-talk.1995q2/0150.html, Apr. 19, 1995, 2 pages.
Natale, Bob, "Windows SNMP, An Open Interface for Programming Network Management Applications Using the Simple Network Management Protocol Under Microsoft Windows", Version 1.0, American Computer & Electronics Corporation, Gaithersburg, Maryland, Sep. 13, 1993, 103 pages.
Nelson, T., "Session 4: Complex Information Processing", ACM 20th National Conference, 1965, pp. 84-100.
Neuss, Christian, Re: Passing Info Between Pages:, e-mail posted at http://1997.webhistory.org/www.lists/www-talk.1994q1/0106.html, Jan. 10, 1994, 2 pages.
O'Reilly, Richard, "2 Programs That Make Personal Finance Easier", Computer File, Los Angeles Times, California, Oct. 1, 1992, 3 pages.
Packard, Keith, "X Display Manager Control Protocol, MIT X Consortium Standard", Version 1.0, Laboratory for Computer Science, Massachusetts Institute of Technology, 1989, 19 pages.
Payne, "AF2R2 Announcement—AudioFile Version 2, Release 2, README", Feb. 16, 1993, 280 pages.
"Personal Finance: Quicken Adds Over 100 Improvements", WorkGroup Computing Report, vol. 3, Sep. 14, 1992, 3 pages.
"PowerBASIC: Downloads", posted at http://www.powerbasic.com/files/pub/AllFiles.asp, Jul. 26, 2000; May 23, 1994; Jul. 18, 1993; Mar. 26, 2001, Jul. 19, 1995; Mar. 3, 1993; Nov. 18, 1993; Nov. 12, 1995, Dec. 4, 1992, Apr. 14, 2003, 1 page.
Quatromoni, Karen, "Digital Announces New Commercial Internet Capabilities at Internet World '94", Posted at http://www.panix.com/-clocke/meckler-web/dec-internet.html, Jun. 1, 1994, 2 pages.
"Quicken for Windows 2.0", PC Computing Magazine, Jan. 1993, 3 pages.
"Quicken 6.0 Adds Electronic Credit Card Statements", by Bill Howard, PC Magazine, Nov. 10, 1992, 7 pages.
Raggert, Dave, "Re: Link Info Outside Doc", WWW-Talk Jul.-Sep. 1993, posted at http://1997.webhistory.org/www.lists/www-talk.1993q3/0012.html, Jul. 1, 1993, 1 page.
Raggert, Dave, "Mediated Digest Authentication", Internet Draft Memorandum, Mar. 27, 1995, 9 pages.
Raggert, Dave, "Re: Comments on html+discussion document (dated Nov. 2, 1993)", WWW-Talk Jan.-Mar. 1994, Jan. 7, 1994, 14 pages.
Rodgers et al., "On-Line Images from the History of Medicine (OLI): Creating a Large Searchable Image Database for Distribution via World-Wide Web", National Library of Medicine, Bethesda, Maryland (undated) p. 423-431.
Rosen, Jan, "Strategies; For the Do-it-Yourself Financial Planner, Software to the Rescue", The New York Times, Jan. 2, 1993, 2 pages.
"A Sample Authorization Protocol for X", posted at /home/jg/Archive/ftp.x.org/pub/X11R4/mit/lib/Xau/README, Dec. 8, 1988, 3 pages.
St. Johns, M., "Identification Protocol", Network Working Group, US Department of Defense, Feb. 1993, 7 pages.
St. Johns, M., "Authentication Server", Network Working Group, TPSC, Jan. 1985, 5 pages.
Scheifler et al., "The X Window System", Software-Practice and Experience, vol. 20, Oct. 1990, 34 pages.
Schwartz, John, "Giving Web a Memory Costs Its Users Privacy", The New York Times, Sep. 4, 2001, 5 pages.
Siegmann, Ken, "ComputerLand Declares Ware on JWP Businessland", The San Francisco Chronicle, Dec. 12, 1991, 2 pages.
Sinha et al., "msjnetb.txt, An Introduction to Network Programming Using the NetBios Interface", undated, 17 pages.
Sun Microsystems, Inc., "NFS: Network File System Protocol Specification", Mar. 1989, 8 pages.
Treese, G. Winfield, "Bix.dec Frequently Asked Questions", e-mail posting, Mar. 5, 1994, 8 pages.
Treese, G. Winfield et al., "X Through the Firewall and Other Application Relays", Digital Equipment Corporation, Cambridge Research Laboratory, May 3, 1993, 20 pages.
Tsudik, Gene et al., "On Simple and Secure Key Distribution", Communications and Computer Science Department, IBM Zurich Research Laboratory, Switzerland, Nov. 1993, 8 pages.
Turner, Melissa, "A National Campaign: Atlanta's Summer Tourism Budget hits $2 million with Help from Visa", The Atlanta Constitution, May 7, 1993, 2 pages.
Weibel, et al., "An Architecture for Scholarly Published on the World Wide Web", Office of Research, OCLC Online Computer Library Center, Inc., Dublin, Ohio, undated, 8 pages.
Weibel, et al., various e-mail communications dated Aug. 22-Aug. 24, 1994, entitled "the I-D Directories?", 3 pages.
*Soverain Software LLC v. CDW et al.*, Amended P.R. 4-3 Joint Claim Construction and Prehearing Statement, Jury Trial Demanded, filed Mar. 27, 2009, 8 pages.
Exhibit A to *Soverain Software LLC v. CDW et al.*, Amended P.R. 4-3 Joint Claim Construction and Prehearing Statement, Jury Trial Demanded, filed Mar. 27, 2009, 7 pages.
Exhibit B to *Soverain Software LLC v. CDW et al.*, Amended P.R. 4-3 Joint Claim Construction and Prehearing Statement, Jury Trial Demanded, filed Mar. 27, 2009, 15 pages.
Exhibit C to *Soverain Software LLC v. CDW et al.*, Amended P.R. 4-3 Joint Claim Construction and Prehearing Statement, Jury Trial Demanded, filed Mar. 27, 2009, 111 pages.
Exhibit D to *Soverain Software LLC v. CDW et al.*, Amended P.R. 4-3 Joint Claim Construction and Prehearing Statement, Jury Trial Demanded, filed Mar. 27, 2009, 46 pages.
Exhibit E to *Soverain Software LLC v. CDW et al.*, Amended P.R. 4-3 Joint Claim Construction and Prehearing Statement, Jury Trial Demanded, filed Mar. 27, 2009, 3 pages.
*Soverain Software LLC v. CDW et al.*, Order Granting Leave to File Amended Claim Construction, Jury Trial Demanded, filed Mar. 24, 2009, 2 pages.
*Soverain Software LLC v. CDW et al.*, Civil Action No. 6:07-CV-511, Joint Invalidity Contentions for CDW Corporation, Newegg Inc and Zappos.com, dated Aug. 20, 2008.
"X.25", www.webopedia.com entry, May 1, 2001, 4 pages.
WWW-Talk Apr.-Jun. 1995: Session Tracking, Apr.-Jun. 1995, 50 pages.
Google Groups, WWW Games?, comp.infosystems.www, Feb.-Mar. 1994, 15 pages.

(56) References Cited

OTHER PUBLICATIONS

Wiseman, Paul, "The Internet Snares More Businesses" USA Today. com, Jul. 7, 1994, p. 1.B.
Wells, David, "High Speed X.25 and Frame Relay—a comparison", undated, 5 pages.
Perrochon, Louis, "Translation Servers: Gateways Between Stateless and Stateful Information Systems", Zurich, Switzerland, 1994, 12 pages.
McFadden, Andy, "Transactional Services on WWW", May 12, 1994, 5 pages.
The Santa Cruz Operations, "SCO Puts Business on the Information Highway", Mar. 7, 1994, 2 pages.
Taylor, Dave, "The Internet Mall: Shopping on the Information Highway", Sep. 15, 1995, 35 pages.
Berners-Lee, Tim, "Uniform Resoource Locators: A Syntax for the Expression of Access Information of Objects on the Internet", Mar. 21, 1994, 20 pages.
Steiner et al., "Kerberos: An Authentication Service for Open Network Systems", Project Athena, Massachusetts Institute of Technology, Mar. 30, 1988, 15 pages.
Google Groups, Comp.Infosystems.www, "Stateful server via special URL's", Jul. 1993, 4 pages.
Google Groups, Comp.Infosystems.www, "Stateful connections via WWW", Dec. 1993, 1 page.
Google Groups, Comp.Infosystems.www, "Stateful HTTP?", Feb. 1994, 5 pages.
Seltzer, "The Internet—A New Dimension", http://samizdat.com/gli8mpse.html, 1994, 4 pages.
Rybczynski, Anthony, "X.26 Interface and End-to-End Virtual Circuit Service Characteristics", IEEE transactions on Communications, vol. Com-28, No. 4, Apr. 1980, 11 pages.
Kuzela, Lad, "'Shop' by Television; Redcoats Join Communications Fight" Business Trends, Feb. 22, 1982, 2 pages.
Rathore, R., et al., "Service Provisioning Operations for Public Packet Switched Network (PPSN) Access", IEEE Communications Magazine, Oct. 1987-vol. 25, No. 10, 6 pages.
Google Groups, Comp.sys.hp.mpe, "Query Image From Netscape-HTTP Tutorial Enclosed", Mar. 1995, 6 pages.
Kohn, Dan, "Prior Art on OpenMarket Patents", Mar. 9, 1998, 1 page.
Schubert, Eric, "Personal Data Access on the Campus Network", University of Notre Dame, Indiana, undated, 5 pages.
Kohl et al., "The Kerberos Network Authentication Service (V5)", Digital Equipment Corporation, Sep. 1993, 105 pages.
Franks et al., "An Extension to HTTP: Digest Access Authentication", Network Working Group, Jan. 1997, 18 pages.
Sirbu et al., "NetBill: An Internet Commerce System Optimized for Network-Delivered Services", IEEE Personal Communications, Aug. 1995, 6 pages.
Cox et al., "NetBill Security and Transaction Protocol", Carnegie Mellon University, Pittsburgh, Pennsylvania, undated, 12 pages.
Mathison, Stuart L., "Commercial, Legal, and International Aspects of Packet Communications", Proceedings of the IEEE, vol. 66, No. 11, Nov. 1978, pp. 1537-1539.
Lewis, Peter H., "The Executive Computer; A Growing Internet is Trying to Take Care of Business", The New York Times, Dec. 12, 1993, 32 pages.
Lewis, Peter H., "On-Line Middleman Opens for Business", The New York Times, Oct. 2, 1995, 3 pages.
Lewis, Peter H., "Getting Down to Business on the Net", The New York Times, Jun. 19, 1994, 1 page.
Steiner, Newman, and Schiller, "Kerberos: An Authentication Service for Open Network Systems", Steiner (Massachusetts Institute of Technology), Newman (University of Washington), Schiller ((Massachusetts Institute of Technology), Mar. 30, 1988, 15 pages.
Carnegie Mellon University Information Networking Institute, "Internet Billing Server Prototype Scote Document INI Technical Report 1993-1", Oct. 14, 1993, 29 pages.
Wiil, Uffe, Leggett, John, "Hyperform: Using Extensibility to Develop Dynamic, Open and Distributed Hypertext Systems", Wiil (The University of Aalborg, Denmark), Leggett (Texas A & M University), Milano, Nov. 30-Dec. 1992, pp. 251-261.
Hughes, Kevin, "Entering the World-Wide Web: A Guide to Cyberspace", Honolulu Community College, Oct. 1993, 17 pages.
Hughes, Kevin, "Entering the World-Wide Web: A Guide to Cyberspace", ACM Siglink Newsletter, vol. III No. 1, Mar. 1994, p. 4-8.
Huang et al., "Evolution and Integration of a Multi-Media Communications Network", Siemens Public Switching Systems, Inc., Boca Raton, Florida, 1989 IEEE, pp. 0956-0960.
Google Groups, Comp.infosystems.www, "HTTP Servers with State?", Jan. 1994, 2 pages.
Google Groups, Comp.sys.hp.mpe, "hp3k & gopher & Web update transaction article", Jan. 1995, 3 pages.
Google Groups, Comp.sys.hp.mpe, "How we do personalized gopher and Web authentication", Jan. 1995, 2 pages.
Google Groups, Bionet.general, "Gopher Conference 93 (Yet another report)", May 1993, 8 pages.
Miller, et al., "Kerberos Man Page", MIT Project Athena, Kerberos Version 4.0, Copyright 1985, 1986 Massachusetts Institute of Technology, 4 pages.
Curtis, Franlin Jr., "Selling Internet Access", VARBusiness, Copyright 1994, CMO Publications, Sep. 1, 1994, 6 pages.
"First Virtual Corporate Brochure", Copyright 1995, First Virtual Holdings Incorporated, 28 pages.
Rosenthal, Doug, "EINet: A Secure, Open Network for Electronic Commerce", MCC EINet, 1994 IEEE, pp. 219-226.
Crocker, et al., "CyberCash: Payments Systems for the Internet", Proc. INET 1995, 2 pages.
Google Groups, "Condom Country", 1994, 5 pages.
CompuServe, "Shopping—The Electronic Mall", pp. 109-113.
"Company News: Food from Cyberspace; For Ameritech, On-Line Food Shopping", The New York Times, Apr. 3, 2008, 6 pages.
Cohen et al., "X.25 Implementation—The Untold Story", Bill Telephone Laboratories, New Jersey, Copyright 1983, pp. 60-64.
Chang et al., "Architecture Alternative for Wireless Data Services: Interworking with Voiceband Modem", Bellcore, Red Bank, New Jersey, Copyright 1994, IEEE, 8 pages.
C.W., A.N., L.M., "Business the Internet Way", The Age, Melbourne, Australia, Feb. 15, 1994, 3 pages.
Berners-Lee, Tim, "Hypertext Transfer Protocol: A Stateless Search, Retrieve and Manupulation Protocol", Nov. 5, 1993, 25 pages.
Belsie, Laurent, "Powerful Internet Should Skyrocket as Firms Go On-Line", The Christian Science Monitor, Mar. 16, 1994, 1 page.
Bass, Brad, "AT&T Disconnects vintage Net Service", FCW.com, Dec. 6, 1998, 2 pages.
Atkins et al., "The Development of Packet Data Communications in the ISDN", British Telecom Research Laboratories, UK, undated, pp. 386-390.
"Answers.com", Peapod, Inc., Copyright 2008, 6 pages.
Motoda et al., "An Experimental Verification of Relational Database Access Over WWW", NTT Software Laboratories, Tokyo, Japan, undated, 8 pages.
Lavenant et al., "The Phoenix Project: Distributed Hypermedia Authoring", Biological Sciences Division Academic Computing, Chicago, Illinois, undated, 6 pages.
McCool, Rob, "using PGP/PEM? using Kerberos?", www-Talk Jan.-Mar. 1994: using PGP/PEM? using Kerberos?, Feb. 25, 1995, 1 page.
Shafer, Dan, "Using Oracle with HyperCard", Hayden Books, Carmel, Indiana, Copyright 1990, 433 pages.
Google Groups, comp.infosystems.www, "Using FORMS", Dec. 1993, 2 pages.
Ellsworth et al., "Using CompuServe—The Comprehensive Guide to all the Online Services and Resources Available!", Copyright 1994 by Que Corporation, 470 pages.
McKee, Douglas, "Towards Better Integration of Dynamic Search Technology and the World-Wide Web", undated, 7 pages.
December, John et al., "The World Wide Web Unleashed", Copyright 1994 by Sams Publishing, 5 pages.
Doelz, R., et al., "The Use of WWW in Biological Research", undated, 7 pages.

(56) References Cited

OTHER PUBLICATIONS

Carr, L., et al., "The Microcosm Link Service and its Application to the World Wide Web", Dept.of Electronics and Computer Science, U of Southampton, England, undated, 10 pgs.

Mansfield, Niall, "The Joy of X: An Overview of the X Window System", Addison-Wesley Publishing Company, Copyright 1993, 378 pages.

Ellsworth, Jill et al., "The Internet Business Book", John Wiley &Sons, Inc., Copyright 1994, 393 pages.

Kane, Pamela, "The Hitchhiker's Guide to the Electronic Highway", MSI Press, Inc., Copyright 1994, 403 pages.

"QSL—Quill Service Link: Your Electronic Connection to Superior Service and Best Values in Office Products", Quill Corporation, Copyright 1988, 34 pages.

Davis, Russell, "Network Authentication Tokens", Ford Aerospace, Virginia, Copyright 1990 IEEE, pp. 234-238.

Sheridan, John, "Marketing by Modem; Computer System Will Link Firm with 100,000 Customers by Yearend", Industry Week, Jun. 6, 1988, 2 pages.

Fielding, Roy T., "Maintaining Distributed Hypertest Infostructures: Welcome to MOMspider's Web", Department of Information and Computer Science, U of California, Irvine, Apr. 17, 1994, 10 pages.

Neuss, Christian et al., "Lost in Hyperspace? Free Text Searches in the Web", Fraunhofer Institute for Computer Graphics, Germany, undated, 8 pages.

Google Groups, comp.infosystems.www, "Invisible 'name-value' pairs in FORMS???", Mar. 1994, 2 pages.

Allen, Wayne, "Insecure WWW Access Authorization Protocol?", Mar. 8, 1994, 2 pages.

"I Didn't Know I could do that on Compuserve!", CompuServe Incorporated, Copyright 1994, 135 pages.

Nielsen, Jakob, "Hyper Text & Hyper Media", Academic Press, Inc., San Diego, California, Copyright 1990, 275 pages.

"HTTP Request Fields", web page document, last modified May 3, 1994, 5 pages.

Google Groups, comp.infosystems.www, "How to Share Data Among CGI Scripts", May-Jun. 1994, 4 pages.

Google Groups, comp.infosystems.www.providers, "How to Maintain STATE?", Aug.-Sep. 1994, 4 pages.

Google Groups, comp.infosystems.www.providers, "How to Maintain State: ANSWERS", Sep. 1994, 1 page.

Bowen et al., "How to Get the Most Out of CompuServe", Bantam Books, Feb. 1989, 494 pages.

Fleming et al., "Handbook of Relational Database Design", Copyright 1989 by Addison-Wesley Publishing Company, Inc., 610 pages.

McBryan, Oliver A., "GENVL and WWWW: Tools for Taming the Web", University of Colorado, Department of Computer Science, undated, 12 pages.

Payne, "FastCGI: A High-Performance Web Server Interface", Open Market, Inc., Apr. 1996, 7 pages.

Cronin, Mary J., "Doing Business on the Internet: How the Electronic Highway is Transforming American Companies", Copyright 1994 by Van Nostrand Reinhold, 314 pages.

Google Groups, alt.internet.services, "Cypberspace Development: Builders of Internet Storefronts", Nov. 1993, 2 pages.

Wikipedia Page, "CUC International", Page last modified on May 22, 2008, 3 pages.

Business Wire, "CUC International Acquires Netmarket Company A Leader in Bringing Commerce to the Internet", Nov. 14, 1994, 6 pages.

Batini et al., "Conceptual Database Design: An Entity-Relationship Approach", The Benjamin/Cummings Publishing Company, Inc., Copyright 1992, 491 pages.

Google Groups, comp.databases, "Client-Server Database Query", May 1994, 2 pages.

Reid, Robert H., "Architects of the Web: 1,000 Days that Built the Future of Business", Published by John Wiley & Sons, Inc., Copyright 1997, 421 pages.

Koster, Martijn, "Aliweb—Archie-Like Indexing in the WEB", Mar. 16, 1994, 10 pages.

Meschkat, Steffen, "Active Articles in Interactive Journals", Apr. 15, 1994, 5 pages.

Stewart et al., "101 Database Exercises", Glencoe McGraw-Hill, Copyright 1992, 153 pages.

NCSA HTTPd, "Upgrading NCSA HTTPd", http://hoohoo.ncsa.uiuc.edu/docs/Upgrade.html, May 18, 2005, 11 pages.

Wheaton, How to Create a Customer Database. (Lists and Databases), Direct Marketing, Feb. 1, 1990, 8 pages.

Nickerson, WorldWideWeb: hypertext from CERN. (European Particle Physics Laboratory), Computers in Libraries, Dec. 1, 1992, 2 pages.

Berners-Lee, "Information Management: A Proposal", The original proposal of the WWW, HTMLized, Mar. 1989, May 1990, 13 pages.

Berners-Lee, "Hypertext Markup Language: A Representation of Textual Information and MetaInformation for Retrieval and Interchange", Jun. 1993, 40 pages.

Deloitte & Touche, "A Special Report on the Impact of Technology on Direct Marketing in the 1990s", Direct Marketing Association, Inc., Copyright 1990, 107 pages.

Goodman, John, "Leveragain the Customer Databased to your Competitive Advantage. (Retail/Database)", Direct Marketing, Dec. 1, 1992, 4 pages.

Fodor, George, "Attitudes Anchor Harbor Sales: Inside Salespeople at Harbor Tool Supply Call on 252 Years of Collective Experience in Helping Process the Firm's Business", Industrial Distribution, Jun. 1, 1990, 6 pages.

Zodrow, Michael, "Bear Creek Builds In-House Gold Mine. (Mail Order marketer Bear Creek Corp.)(Database)", Direct Marketing, Jan. 1, 1993, 8 pages.

Google Groups, Comp.sys.mac.databases, "Mac Database Summary", Sep. 1992, 14 pages.

Google Groups, Comp.sys.mac.hypercard, "Using Hypercard on a Network", Jan.-Feb. 1994, 3 pages.

Schlender, Brenton R., "New Software Beginning to Unlock the Power of Person Computers", Wall Street Journal, Nov. 16, 1987, p. 33.

Varela et al., "Zelig: Schema-Based Generation of Soft WWW Database Applications", U of Illinois, Department of Computer Science, undated, 8 pages.

Goodman, Danny, "The HyperCard Handbook 1.2 Upgrade Kit", Bantam Books, Oct. 1988, 173 pages.

Morgan, Eric Lease, "Implementing TCP/IP Communications with HyperCard", Information Technology and Libraries, Dec. 1992, pp. 421-432.

Google Groups, Comp.infosystems.www, "WWW FAQ v.0.1 (fwd)", May 1993, 5 pages.

Smith, Janet A., "The New Frontier (Use of New Technologies in Marketing) (Includes Related Articles) (Part 5)", Direct Marketing, Sep. 1, 1991, 7 pages.

Smith, Janet A., The New Frontier (Data Base Marketing) (Part 2 in a Series), Direct Marketing, Jun. 1, 1991, 6 pages.

Wesley-Tanaskovic et al., "Expanding Access to Science and Technology: The Role of Information Technologies", Proceedings of the Second International Symposium on the Frontiers of Science and Technology Held in Kyoto, Japan, May 12-14, 1992, 7 pages.

Conklin, Jeff, "Hypertext: An Introduction and Survey", Microelectronics and Computer Technology Corp., Sep. 1987, 25 pages.

Google Groups, Comp.Infosystems.www, "Transactional Services on WWW" May-Jun. 1994, 4 pages.

Hickey, Mary, "Shopping at Home: One Modem Line, No Waiting", Home PC, 1994, 3 pages.

Ellis, Caron Schwarts, "Infopreneurs Find Opportunity with On-Line Commercialization", Boulder County Business Report, Boulder, Colorado, Dec. 1993, Dec. 1993, vol. 12 Issue 12, Dec. 1993, 4 pages.

Sheeler, Jim, "Virtual Malls Allow Shoppers to Browse in Digital Marketplace", Extract from Boulder Daily Camera, Mar. 22, 1994, 2 pages.

Plugge, et al., "American Airlines' 'Sabre' Electronic Reservations System", undated, 9 pages.

(56) References Cited

OTHER PUBLICATIONS

Woodhead, Nigel, "Hypertext and Hypermedia: Theory and Applications", Sigma Press, Addison-Wesley Publishing Company, 1991, 237 pages.
Google Groups, Bit.listserv.dectei-I, "Dec's Digital Store Now on the Internet", Jan. 1994, 1 page.
SABRE Travel Information Network, "User's Guide SABRE with Windows Version 1.0", Jan. 1993, 314 pages.
Apple Computer, Inc., "HyperCard Reference Manual", Copyright 1993 Apple Computer, Inc., 449 pages.
Goodman, Danny, "The Complete HyperCard Handbook—Second Edition", Bantam Books, Oct. 1988, 869 pages.
PC Week, "Hypertext Sofware Helps Users Weave Complex Data Webs", Mar. 1, 1988, 3 pages.
Cerf et al., "Specification of Internet Transmission Control Program", Network Working Group, Dec. 1974 Version, 66 pages.
Sullivan, Earmonn, "HTTP Eases Access to Internet Info", PC Week, Jan. 31, 1994, 2 pages.
Roban, Roberta et al., "Discovering WESTLAW: The Essential Guide—3rd Edition", Copyright 1993, West Publishing Company, 317 pages.
Shneiderman et al., "Hypertext Hands-On! An Introduction to a New Way of Organizing and Accessing Information", Copyright 1989 by Addison-Wesley Publishing Company, Inc., 186 pages.
McAleese et al., "Hypertext: State of the Art", Copyright 1990, Intellect Ltd., 281 Pages.
Brown, Heather, "Hypermedia/Hypertext and Object-Oriented Databases", Published by Chapman & Hail, Copyright 1991, 329 pages.
Gluck, Myke, "HyperCard, HyperText, and HyperMedia for Librarys and Media Centers", Libraries Unlimited Inc, Englewood, Colorado, Copyright 1989, 294 pages.
WWWorder e-mail posting seeking Beta (Final Release) Testers for Internet ShopKeeper, Jul. 25, 1994, 1 pages.
Various WWWorder Archive, "Get WWWorder WWWorder.Archive.9406 (1/1)", "Authentification for Hire", "Authentification for Hire (fwd)", "Hours Jun. 27, 1994", "Overwhelming Response to that mailing list—interesting!", "My Implementation (fwd)", Jun. 1994, 22 pages.
Preset, Adam, "Graduates Capitalize on Internet", The Phoenix, Swarthmore College, Swarthmore, Pennsylvania, Apr. 19, 1994, 2 pages.
Friedling, Bill, "Shopping at your Desktop", The Philadelphia Inquirier, Jun. 5, 1994, 2 pages.
Byrt, Frank, "Shopping at the High-Tech Mall", Business Section, New Hampshire Index, Jun. 19, 1994, 2 pages.
Looney, Paul, "iT Works: the Simple Business System", Operating Manual for Version 7, Copyright 1994 by Paul Looney, 117 pages.
Litwin et al, "Multidatabase Interoperability", Computer, Dec. 1986 IEEE, 9 pages.
Little, Thomas, "Multimedia at Work: Commerce on the Internet", IEEE MultiMedia, Winter 1994, pp. 74-78.
Athena History (1983-Present) from A to Z, posted at http://web.mit.edu/acs/athena.html, Oct. 8, 2008, 12 pages.
Tygar, J.D., "Atomicity in Electronic Commerce", Carnegie Mellon University, Pittsburgh, Pennsylvania, School of Computer Science, Jan. 1996, 22 pages.
Google Groups, Comp.infosystems.www, "Authentication on the Web?" Jul. 1994, 2 pages.
Google Groups, Comp.infosystems.www.misc, "How to Get Statefull HTML Documents", Jun. 1994, 2 pages.
Baron, Chris, "Dr. Dobb's Portal: Implementing a Web Shopping Cart", Sep. 1, 1996, 9 pages.
Morgan, Eric Lease, "Implementing TCP/IP Communications with HyperCard", Published in Information Technology and Libraries, Dec. 1992, 12 pages.
Miller, et al., "Manpagez: man pages & More: man kerberos(1)", Copyright 1985, 1986, 1989-1996, 2002, Massachusetts Institute of Technology, 2 pages.
NCS HTTPd, Mosaic User Authentication Tutorial, printed Dec. 5, 1995, 7 pages.
Google Groups, Cern.www.talk, "Not Dropping the Connection Was: Re: WWW games?", Mar. 1994, 4 pages.
HyperActive Software, "Cool Things our Readers do with HyperCard", printed from http://www.hyperactivesw.com/HCStories/stories3.html on Sep. 19, 2008.
Systemax and TigerDirect's Invalidity Contentions, Appendix I, dated Jul. 21, 2008.
Systemax and TigerDirect's Invalidity Contentions, Appendix III, dated Jul. 21, 2008.
Amazon Final Invalidity Contententions—web2mush—U.S. Pat. No. 5,708,780.
Photographs of the JBA System Development.
*Soverain Software* v. *CDW et al.*, Invalidity Contentions (Case 6:07-cv-00511) dated Aug. 20, 2008, Transcript of Youtube.com Video of Henry Bertolon-NECX CEO, 5 pages.
*Soverain Software* v *CDW Corp. et al*, Invalidity Contentions(Case 6:07-cv-00511)dtd Aug. 20, 2008 Transcript of "An Introduction to Apple's Hypercard, Computer Chronicles 1987",15pg.
*Soverain Software* v. *CDW Corp. et al.*, Invalidity Contentions (Case 6:07-cv-00511) dated Aug. 20, 2008, CD—Mark-Jason Dominus' Maze Game, 1994.
*Soverain Software* v. *CDW et al.*, Invalidity Contentions (Case 6:07-cv-00511) dated Jul. 21, 2008, CD—Electronic Mall CompuServe Video Clip—Zip File.
*Soverain Software* v. *CDW et al.*, Invalidity Contentions (Case 6:07-cv-00511) dated Jul. 21, 2008, CD—Exhibit 33—Zip File.
*Soverain Software* v. *CDW et al.*, Invalidity Contentions (Case 6:07-cv-00511) dated Jul. 21, 2008, CD—Exhibit 60—Zip File.
*Soverain Software* v. *CDW et al.*, Invalidity Contentions (Case 6:07-cv-00511) dated Jul. 21, 2008, CD—Exhibit 65—Zip File.
*Soverain Software* v. *CDW et al.*, Invalidity Contentions (Case 6:07-cv-00511) dated Jul. 21, 2008, CD—Exhibit 76—Zip File.
*Soverain Software* v. *Amazon.com*, (6:04-CV-14), Soverain's [corrected] Fifth Supplemental Responses to Amazon.com's 1st Set of Interrogatories (Nos. 1-14), dated Aug. 6, 2005, 10 pages.
*Soverain Software* v. *CDW Corporation et al.*, (6:07-CV-511), Newegg Inc.'s Supplemental Invalidity Contentions, dated Apr. 30, 2009, 108 pages.
*Soverain Software* v. *J.C. Penney Corporation et al.*, (6:09-CV-274), Complaint for Patent Infringement, filed Jun. 25, 2009, 28 pages.
Neuman, B. Clifford and Ts'o Theodore, "Kerberos: An Authentication Service for Computer Networks", USC/ISI Technical Report No. ISI/RS-94-399, vol. 32, No. 9, pp. 33-38, Sep. 1994, 10 pages.
Lavenant, M.G. and Kruper, J.A., "The Phoenix Project: Distributed Hypermedia Authoring", Biological Sciences Division Academic Computing, The University of Chicago, Chicago, Illinois, undated, 6 pages.
*Soverain Software* v. *CDW Corporation et al.*, (6:07-CV-511), Soverain's Responses and Objections to Defendants' First Set of Interrogatories, dated Jun. 11, 2008, 294 pages.
*Soverain Software* v. *CDW Corporation et al.*, (6:07-CV-511), Soverain's Supplemental Responses and Objections to Defendants' First Set of Interrogatories, May 20, 2009, 60 pages.
*Soverain Software* v. *CDW Corporation et al.*, (6:07-CV-511), Claim Construction Order, May 28, 2009, 6 pages.
*Soverain Software* v. *CDW Corporation et al.*, (6:07-CV-511), Soverain's Second Supplemental Responses and Objections to Defendants' First Set of Interrogatories, Jul. 17, 2009, 21 pages.
*Soverain Software* v. *CDW Corporation et al.*, (6:07-CV-511), Expert Report of Edward R. Tittle, dated Jul. 23, 2009, 44 pages.
*Soverain Software* v. *CDW Corporation et al.*, (6:07-CV-511), Defendant Newegg's Motion for Summary Judgment that the '639 Patent is not Entitled to Claim the Benefit of the Filing Date of its Parent Application, and That the Asserted Claims of the '639 Patent are Therefore Invalid, and Brief in Support Thereof with Exhibits, Aug. 17, 2009.
*Soverain Software* v. *CDW Corporation et al.*, (6:07-CV-511), Newegg Inc.'s Second Supplemental Invalidity Contentions, Aug. 26, 2009, 124 pages.

(56) References Cited

OTHER PUBLICATIONS

*Soverain Software* v. *CDW Corporation et al.*, (6:07-CV-511), Supplemental Report of Edward R. Tittle, dated Aug. 28, 2009, 14 pages.
*Soverain Software* v. *CDW Corporation et al.*, (6:07-CV-511), Soverain's Responses and Objections to Newegg's Second Set of Interrogatories, dated Aug. 31, 2009, 13 pages.
*Soverain Software* v. *CDW Corporation et al.*, (6:07-CV-511), Plaintiff Soverain's Opposition to Newegg's Motion for Summary Judgment of Invalidity of the '639 Patent with Exhibits, dated Sep. 11, 2009.
*Soverain Software* v. *CDW Corporation et al.*, (6:07-CV-511), Defendant Newegg's Reply to Plaintiff Soverain's Opposition to Newegg's Motion for Summary Judgment Regarding the Improper Priority Claim and Invalidity of the '639 Patent with Exhibit, Sep. 18, 2009, 15 pages.
*Soverain Software* v. *CDW Corporation et al.*, (6:07-CV-511), Plaintiff Soverain's Surreply in Opposition to Newegg's Motion for Summary Judgment of Invalidity of the '639 Patent, Sep. 28, 2009, 12 pages.
*Soverain Software* v. *CDW Corporation et al.*, (6:07-CV-511), Plaintiff Soverain's Opposition to Newegg's Motion for Summary Judgment of Invalidity of the "Shopping Cart Claims" in U.S. Pat. Nos. 5,715,314 and 5,909,492 with Exhibits, Oct. 13, 2009.
*Soverain Software* v. *CDW Corporation et al.*, (6:07-CV-511), Newegg's Reply to Plaintiff's Response to Newegg's Motion for Summary Judgment of Invalidity of the "Shopping Cart Claims" in U.S. Pat. Nos. 5,715,314 and 5,909,492, dated Oct. 21, 2009, 4 pages.
*Soverain Software* v. *CDW Corporation et al.*, (6:07-CV-511), Plaintiff Soverain's Surreply on Newegg's Motion for Summary Judgment of Invalidity of the "Shopping Cart Claims" in U.S. Pat. Nos. 5,715,314 and 5,909,492, dated Oct. 29, 2009, 4 pages.
*Soverain Software* v. *J.C. Penney Corporation et al.*, (6:09-CV-274), Defendants' Joint Invalidity Contentions and Production of Documents Pursuant to Patent Rules 3-3 and 3-4(b) with Exhibits, Feb. 2010.
Berners-Lee. T.. "Hypertext Transfer Protocol (HTTP) A Stateless Search. Retrieve and Manipulation Protocol," Internet Engineering Task Force Draft, (Nov. 1993).
Bowen, C. and Peyton, D., "How to Get the Most out of CompuServe," 3rd Edition, New York, NY: Bantam Books, United States, (1987).
Expert Report dated Jan. 10, 2011, of Dr. Andrew S. Cromarty regarding invalidity of U.S. Pat. No. 7,272,639, issued Sep. 18, 2007, *Soverain Software LLC* v. *J.C. Penney Corporation, Inc. et al.*, (E.D. Tex. 6:09-cv-00274).
Patent Owner's Statement dated Apr. 25, 2011, from Soverain Software LLC in response to the Order Granting Request for Ex Parte Reexamination of U.S. Pat. No. 7,272,639, issued Sep. 18, 2007.
Request dated Jan. 18, 2011, for ex parte reexamination of U.S. Pat. No. 7,272,639, issued Sep. 18, 2007.
Rebuttal Report dated Jan. 31, 2011, of plaintiff's expert Michael I. Shamos Ph.D.. J.D., concerning validity (with exhibits), *Soverain Software LLC* v. *J.C. Penney Corporation, Inc. et al.*, (E.D. Tex. 6:09-cv-00274).
Thompson. T., "CBIS NetBios Programmer's Reference," Norcross, GA: CBIS. Inc., United States, 27 pgs., (Apr. 1988).
USPTO Order dated Feb. 25, 2011, granting request for ex parte reexamination of U.S. Pat. No. 7,272,639, dated Sep. 18, 2007.
*Soverain Software LLC* v. *Amazon.com, Inc. et al.* (E.D. Tex. 6:04-cv-00014), Dismissed.
*Soverain Software LLC* v. *CDW Corporation et al.*, (E.D. Tex. 6:07-cv-00511), On appeal to the U.S. Court of Appeals for the Federal Circuit.
*Soverain Software LLC* v. *J.C. Penney Corporation, Inc. et al.*, (E.D. Tex. 6:09-cv-00274), Pending.

\* cited by examiner

Document View

*File*  *Options*  *Navigate*  *Annotate*  *Documents*  *Help*

Title: How to join

URL: http://auth.com/service/nph-createacct.cgi

1. First name ⬚

2. Last name ⬚

3. Choose a screen name (no more than 15 characters)
⬚

4. Choose a password (no more than 15 characters)

Password:
⬚

Re-enter password:
⬚

5. E-mail address
⬚

6. Your birthdate (MM/DD/YY) ⬚

7. U.S. zip code, or country code

Zip/postal code:
⬚

ISO country code
US

FIG. 5

INTERNET SERVER ACCESS CONTROL AND MONITORING SYSTEMS

RELATED APPLICATION

This application is a Continuation of U.S. Ser. No. 11/300,245, which is a Continuation of (1) U.S. Ser. No. 09/005,479 filed Jan. 12, 1998 and now U.S. Pat. No. 7,272,639, and (2) U.S. Ser. No. 09/548,235 filed Apr. 12, 2000 (which is a divisional of U.S. Ser. No. 09/005,479), and (3) U.S. Ser. No. 09/548,237 filed Apr. 12, 2000 (which is also a divisional of U.S. Ser. No. 09/005,479). U.S. Ser. No. 09/005,479 is furthermore a Continuation of U.S. Ser. No. 08/474,096 filed on Jun. 7, 1995, now U.S. Pat. No. 5,708,780. The entire disclosure of each of these prior applications are incorporated herein by reference.

BACKGROUND TO THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

TCP/IP (Transmission Control Protocol/Internet Protocol) is one networking protocol that permits full use of the Internet. All computers on a TCP/IP network need unique ID codes. Therefore, each computer or host on the Internet is identified by a unique number code, known as the IP (Internet Protocol) number or address, and corresponding network and computer names. In the past, an Internet user gained access to its resources only by identifying the host computer and a path through directories within the host's storage to locate a requested file. Although various navigating tools have helped users to search resources on the Internet without knowing specific host addresses, these tools still require a substantial technical knowledge of the Internet.

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month, en route to becoming the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes which indicate how the page should be displayed. The Web client, a browser, reads these codes in order to display the page. The hypertext conventions and related functions of the world wide web are described in the appendices of U.S. patent application Ser. No. 08/328,133, filed on Oct. 24, 1994, issued as U.S. Pat. No. 5,715,314 on Feb. 3, 1998, by Payne et al. which is incorporated herein by reference.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator)—URLs enable a Web browser to go directly to any file held on any Web server. A user may also specify a known URL by writing it directly into the command line on a Web page to jump to another Web page.

The URL naming system consists of three parts: the transfer format, the host name of the machine that holds the file, and the path to the file. An example of a URL may be: http:///www.college.Univ.edu/Adir/Bdir/Cdir/page.html, where "http" represents the transfer protocol; a colon and two forward slashes (://) are used to separate the transfer format from the host name; "www.college.univ.edu" is the host name in which "www" denotes that the file being requested is a Web page; "/Adir/Ddir/Cdir" is a set of directory names in a tree structure, or a path, on the host machine; and "page.html" is the file name with an indication that the file is written in HTML.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

SUMMARY OF THE INVENTION

The present invention relates to methods of processing service requests from a client to a server through a network. In particular the present invention is applicable to processing client requests in an HTTP (Hypertext Transfer Protocol) environment, such as the World-Wide Web (Web). One aspect of the invention involves forwarding a service request from the client to the server and appending a session identification (SID) to the request and to subsequent service requests from the client to the server within a session of requests. In a preferred embodiment, the present method involves returning the SID from the server to the client upon an initial service request made by the client. A valid SID may include an authorization identifier to allow a user to access controlled files.

In a preferred embodiment, a client request is made with a Uniform Resource Locator (URL) from a Web browser. Where a client request is directed to a controlled file without an SID, the Internet server subjects the client to an authorization routine prior to issuing the SID, the SID being protected from forgery. A content server initiates the authorization routine by redirecting the client's request to an authentication server which may be at a different host. Upon receiving a redirected request, the authentication server returns a response to interrogate the client and then issues an SID to a qualified client. For a new client, the authentication server may open a new account and issue an SID thereafter. A valid SID typically comprises a user identifier, an accessible domain, a key identifier, an expiration time such as date, the IP address of the user computer, and an unforgeable digital signature such as a cryptographic hash of all of the other items in the SID encrypted with a secret key. The authentication server then forwards a new request consisting of the original URL appended by the SID to the client in a REDIRECT. The modified request formed by a new URL is automatically forwarded by the client browser to the content server.

When the content server receives a URL request accompanied by an SID, it logs the URL with the SID and the user IF address in a transaction log and proceeds to validate the SID. When the SID is so validated, the content server sends the requested document for display by the client's Web browser.

In the preferred embodiment, a valid SID allows the client to access all controlled files within a protection domain without requiring further authorization. A protection domain is defined by the service provider and is a collection of controlled files of common protection within one or more servers.

When a client accesses a controlled Web page with a valid SID, the user viewing the page may want to traverse a link to view another Web page. There are several possibilities. The user may traverse a link to another page in the same path. This is called a "relative link". A relative link may be made either within the same domain or to a different domain. The browser on the client computer executes a relative link by rewriting the current URL to replace the old controlled page name with a new one. The new URL retains all portions of the old, including the SID, except for the new page name. If the relative link points to a page in the same protection domain, the SID remains valid, and the request is honored. However, if the relative link points to a controlled page in a different protection domain, the SID is no longer valid, and the client is automatically redirected to forward the rewritten URL to the authentication server to update the SID. The updated or new SID provides access to the new domain if the user is qualified.

The user may also elect to traverse a link to a document in a different path. This is called an "absolute link". In generating a new absolute link, the SID is overwritten by the browser. In the preferred embodiment, the content server, in each serving of a controlled Web page within the domain, filters the page to include the current SID in each absolute URL on the page. Hence, when the user elects to traverse an absolute link, the browser is facilitated with an authenticated URL which is directed with its SID to a page in a different path. In another embodiment, the content server may forego the filtering procedure as above-described and redirect an absolute URL to the authentication server for an update.

An absolute link may also be directed to a controlled file in a different domain. Again, such a request is redirected to the authentication server for processing of a new SID. An absolute link directed to an uncontrolled file is accorded an immediate access.

In another embodiment, a server access control may be maintained by programming the client browser to store an SID or a similar tag for use in each URL call to that particular server. This embodiment, however, requires a special browser which can handle such communications was generally not suitable for early browser formats common to the Web. However, it may now be implemented in cookie compatible browsers.

Another aspect of the invention is to monitor the frequency and duration of access to various pages both controlled and uncontrolled. A transaction log within a content server keeps a history of each client access to a page including the link sequence through which the page was accessed. Additionally, the content server may count the client requests exclusive of repeated requests from a common client. Such records provide important marketing feedback including user demand, access pattern, and relationships between customer demographics and accessed pages and access patterns.

The above and other features of the invention including various novel details of construction and combinations of parts will now be more particularly described with reference to the accompanying drawings and pointed out in the claims. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE DRAWINGS

FIG. 5 is an example of an authorization form page.

DETAILED DESCRIPTION OF THE INVENTION

Figure 1:
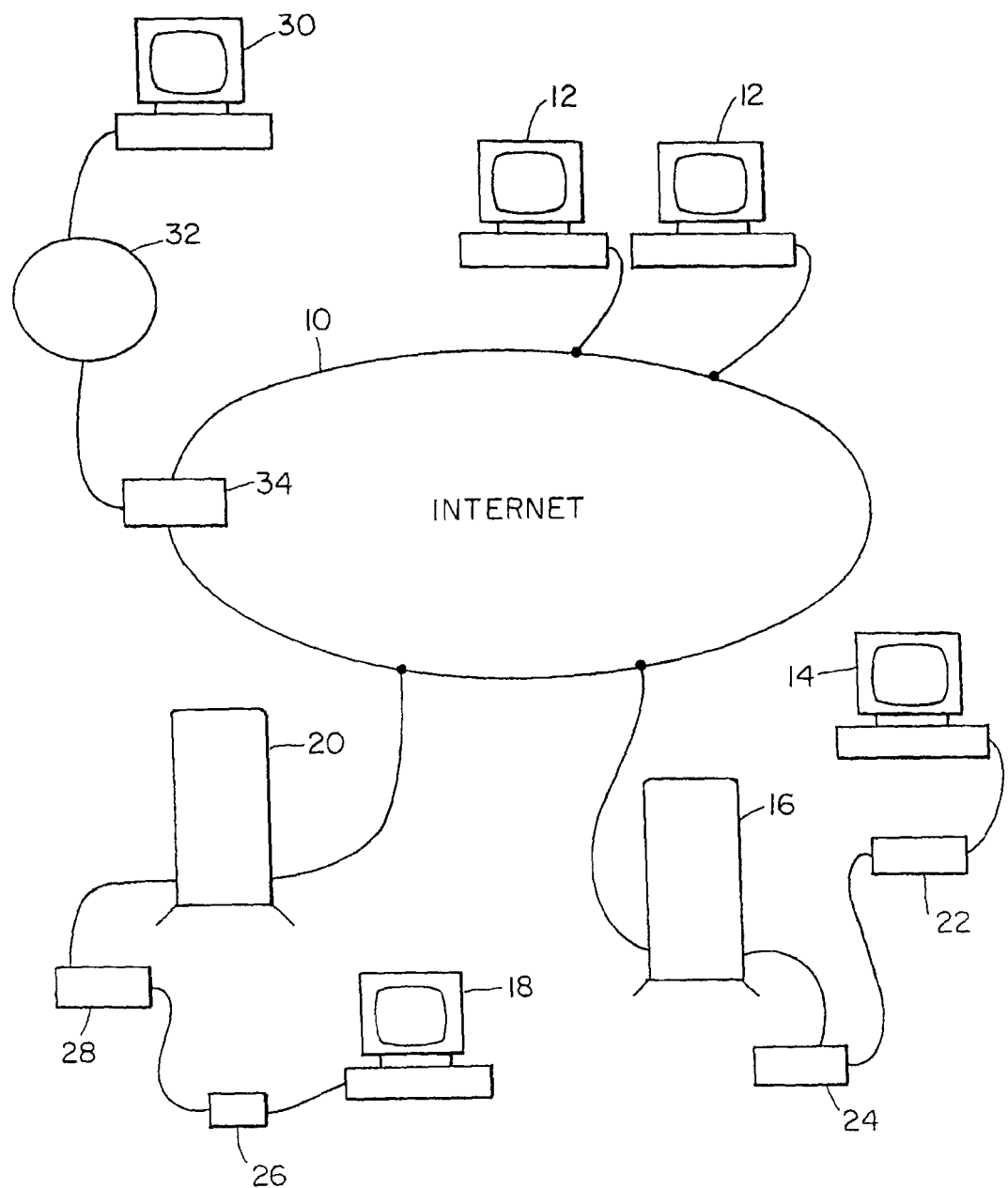
FIG. 1 is a diagram illustrating the Internet operation.

Referring now to the drawings, FIG. 1 is a graphical illustration of the Internet. The Internet 10 is a network of millions of interconnected computers 12 including systems owned by Internet providers 16 and information systems (BBS) 20 such as Compuserve or America Online. Individual or corporate users may establish connections to the Internet in several ways. A user on a home PC 14 may purchase an account through the Internet provider 16. Using a modem 22, the PC user can dial up the Internet provider to connect to a high speed modem 24 which, in turn, provides a full service connection to the Internet. A user 18 may also make a somewhat limited connection to the Internet through a BBS 20 that provides an Internet gateway connection to its customers.

Figure 2A:
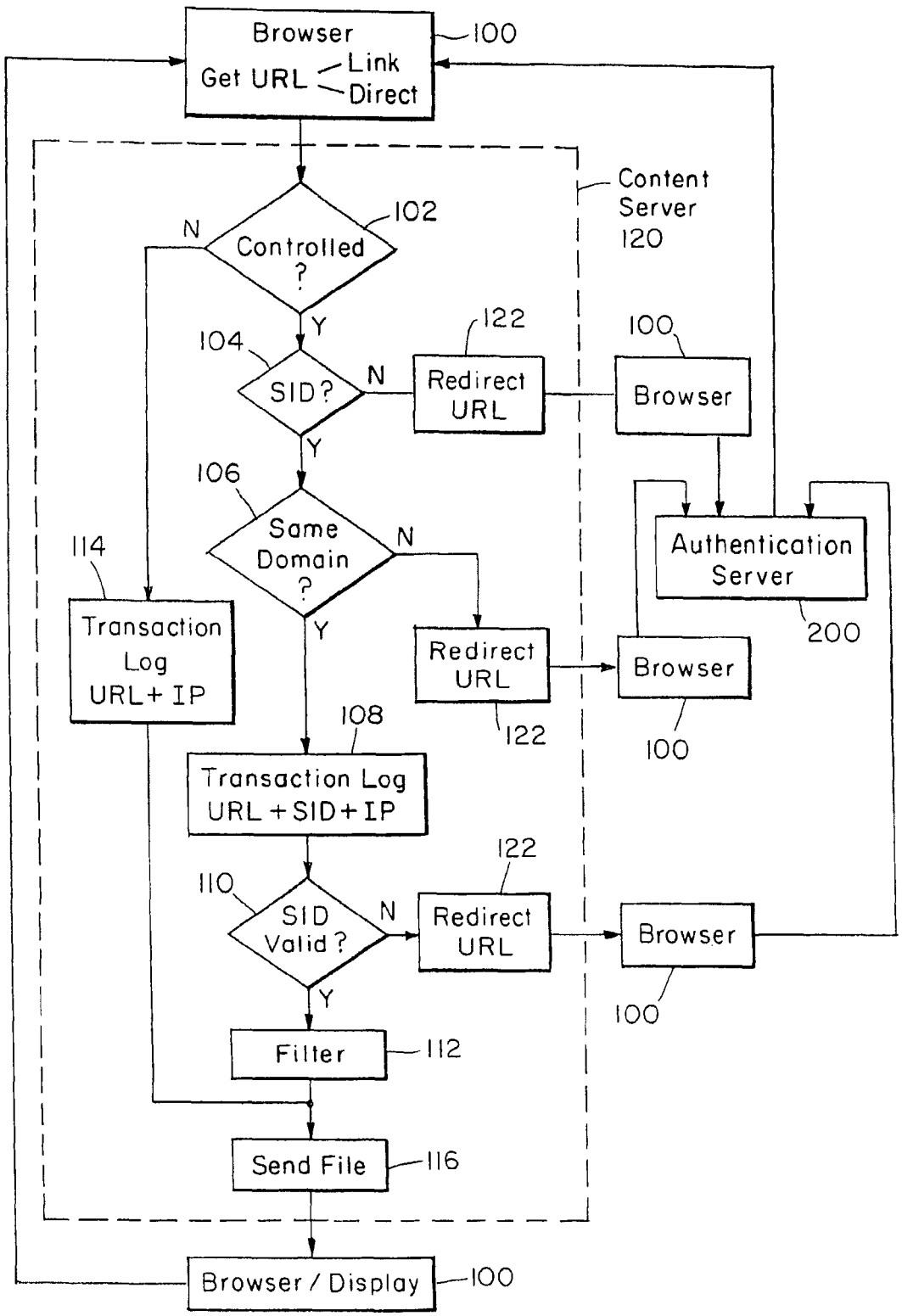
FIG. 2A is a flowchart describing the preferred method of Internet server access control and monitoring.
Figure 4:
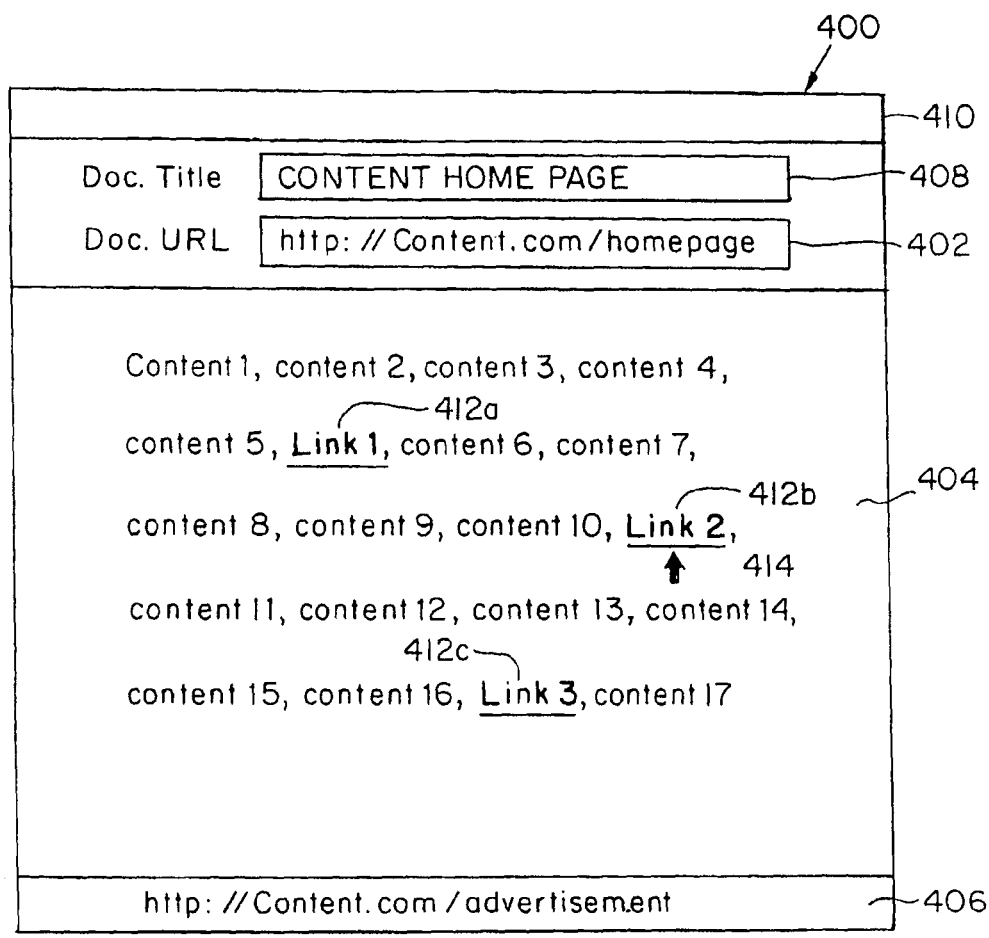
FIG. 4 is an example of a World Wide Web page.

FIG. 2A is a flowchart detailing the preferred process of the present invention and FIG. 4 illustrates a sample Web page displayed at a client by a browser. The page includes text 404 which includes underlined link text 412. The title bar 408 and URL bar 402 display the title and URL of the current web page, respectively. As shown in FIG. 4, the title of the page is "Content Home Page" and the corresponding URL is "http://content.com/homepage". When a cursor 414 is positioned over link text 412b, the page which would be retrieved by clicking a mouse is typically identified in a status bar 406 which shows the URL for that link. In this example the status bar 406 shows that the URL for the pointed link 412b is directed to a page called "advertisement" in a commercial content server called "content". By clicking on the link text, the user causes the browser to generate a URL GET request at 100 in FIG. 2A. The browser forwards the request to a content server 120, which processes the request by first determining whether the requested page is a controlled document 102. If the request is directed to an uncontrolled page, as in "advertisement" page in this example, the content server records the URL and the IF address, to the extent it is available, in the transaction log 114. The content server then sends the requested page to the browser 116 for display on the user computer 117.

If the request is directed to a controlled page, the content server determines whether the URL contains an SID 102. For example, a URL may be directed to a controlled page name "report", such as "http://content.com/report", that requires an SID. If no SID is present, as in this example, the content server sends a "REDIRECT" response 122 to the browser 100 to redirect the user's initial request to an authentication server 200 to obtain a valid SID. The details of the authentication process are described in FIG. 2B and will be discussed later, but the result of the process is an SID provided from the authentication server to the client. In the above example, a modified URL appended with an SID may be: "http://content.com/{SID}/report". The preferred SID is a sixteen character ASCII string that encodes 96 bits of SID data, 6 bits per character. It contains a 32-bit digital signature, a 16-bit expiration date with a granularity of one hour, a 2-bit key identifier used for key management, an 8-bit domain comprising a set of information files to which the current SID authorizes access, and a 22-bit user identifier. The remaining bits are reserved for expansion. The digital signature is a cryptographic hash of the remaining items in the SID and the authorized IF address which are encrypted with a secret key which is shared by the authentication and content servers.

If the initial GET URL contains a SID, the content server determines whether the request is directed to a page within the current domain 106. If the request having a SID is directed to a controlled page of a different domain, the SID is no longer valid and, again, the user is redirected to the authentication server 122.

If the request is for a controlled page within the current domain, the content server proceeds to log the request URL, tagged with SID, and the user IP address in the transaction log 108. The content server then validates the SID 110. Such validation includes the following list of checks: (1) the SID's digital signature is compared against the digital signature computed from the remaining items in the SID and the user IF address using the secret key shared by the authentication and content servers; (2) the domain field of the SID is checked to verify that it is within the domain authorized; and (3) the EXP field of the SID is checked to verify that it is later than the current time, If the validation passes, the content server searches the page to be forwarded for any absolute URL links contained therein 112, that is, any links directed to controlled documents in different content servers. The content server augments each absolute URL with the current SID to facilitate authenticated accesses across multiple content servers. The requested page as processed is then transmitted to the client browser for display 117. The user viewing the requested Web page may elect to traverse any link on that page to trigger the entire sequence again 100.

Figure 2B:
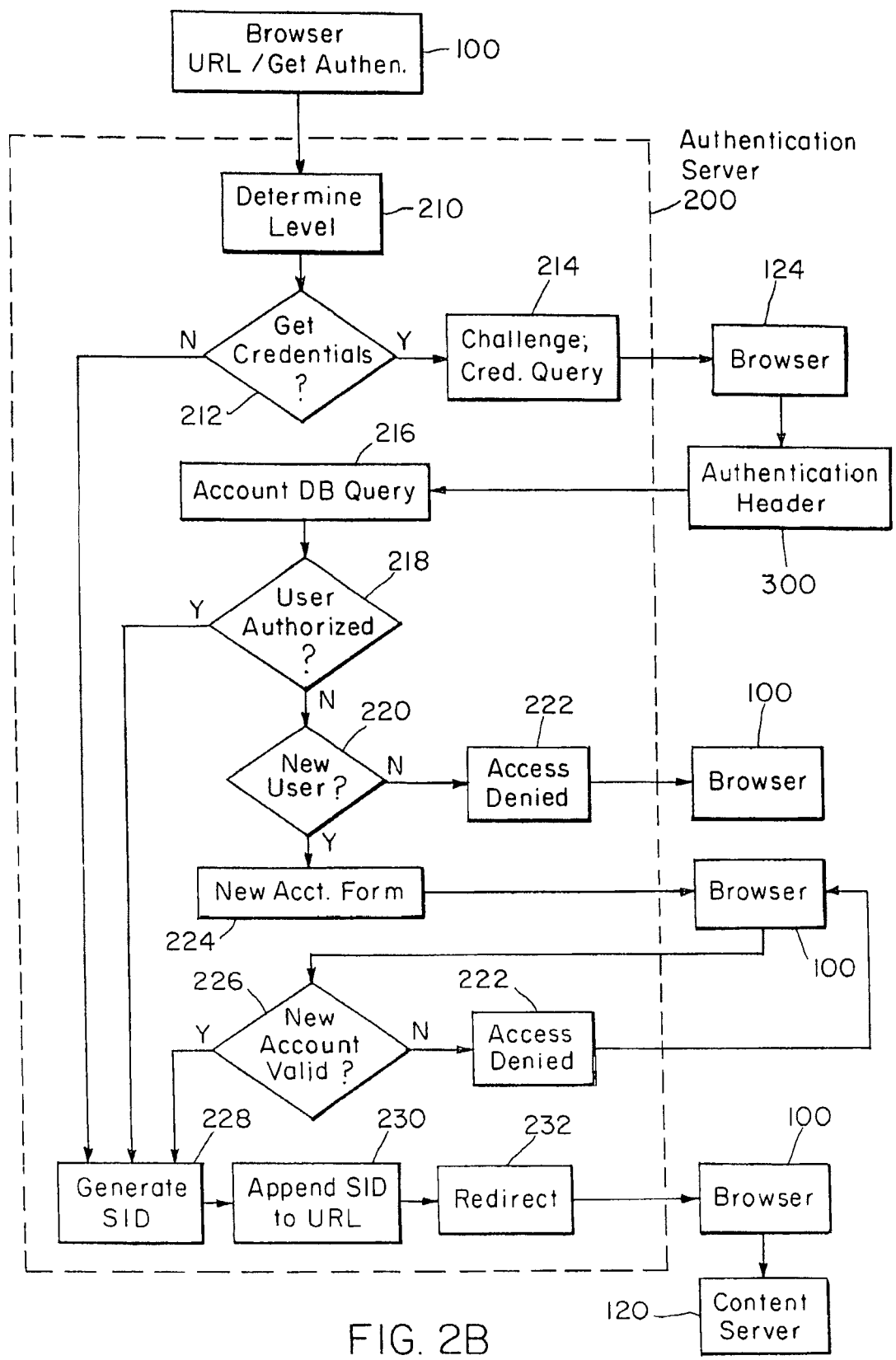
FIG. 2B is a related flowchart describing the details of the authentication process.

FIG. 2B describes the details of the authentication process. The content server may redirect the client to an authentication server. The REDIRECT URL might be: "http://auth.com/authenticate?domain=[domain] &URL=http://content.com/report". That URL requests authentication and specifies the domain and the initial URL. In response to the REDIRECT, the client browser automatically sends a GET request with the provided URL.

Whenever the content server redirects the client to the authentication server 200, the authentication server initiates the authorization process by validating that it is for an approved content server and determining the level of authentication required for the access requested 210. Depending on this level, the server may challenge the user 212 for credentials. If the request is for a low level document, the authentication may issue an appropriate SID immediately 228 and forego the credential check procedures. If the document requires credentials, the authentication server sends a "CHALLENGE" response which causes the client browser to prompt the user for credentials 214. A preferred credential query typically consists of a request for user name and password. If the user is unable to provide a password, the access is denied. The browser forms an authorization header 300 from the information provided, and resends a GET request to the authentication server using the last URL along with an authorization header. For example, a URL of such a GET request may be: "http://auth.com/authenticate?domain=[domain]&URL=http://content.com/report and the authorization header may be: "AUTHORIZE: [authorization]".

Upon receiving the GET request, the authentication server queries an account database 216 to determine whether the user is authorized 218 to access the requested document. A preferred account database may contain a user profile which includes information for identifying purposes, such as client IF address and password, as well as user demographic information, such as user age, home address, hobby, or occupation, for later use by the content server. If the user is authorized, an SID is generated 228 as previously described. If the user is not cleared for authorization, the authentication server checks to see if the user qualifies for a new account 220. If the user is not qualified to open a new account, a page denying access 222 is transmitted to the client browser 100. If the user is qualified, the new user is sent a form page such as illustrated in FIG. 5 to initiate a real-time on-line registration 224. The form may, for example, require personal information and credit references from the user. The browser is able to transmit the data entered by the user in the blanks 502 as a "POST" message to the authentication server. A POST message causes form contents to be sent to the server in a data body other than as part of the URL. If the registration form filled out by the new user is valid 226, an appropriate SID is generated 228. If the registration is not valid, access is again denied 222.

An SID for an authorized user is appended ("tagged") 230 to the original URL directed to a controlled page on the content server. The authentication server then transmits a REDIRECT response 232 based on the tagged URL to the client browser 100. The modified URL, such as "http://content.com/[SID]/report" is automatically forwarded to the content server 120.

Figure 3:
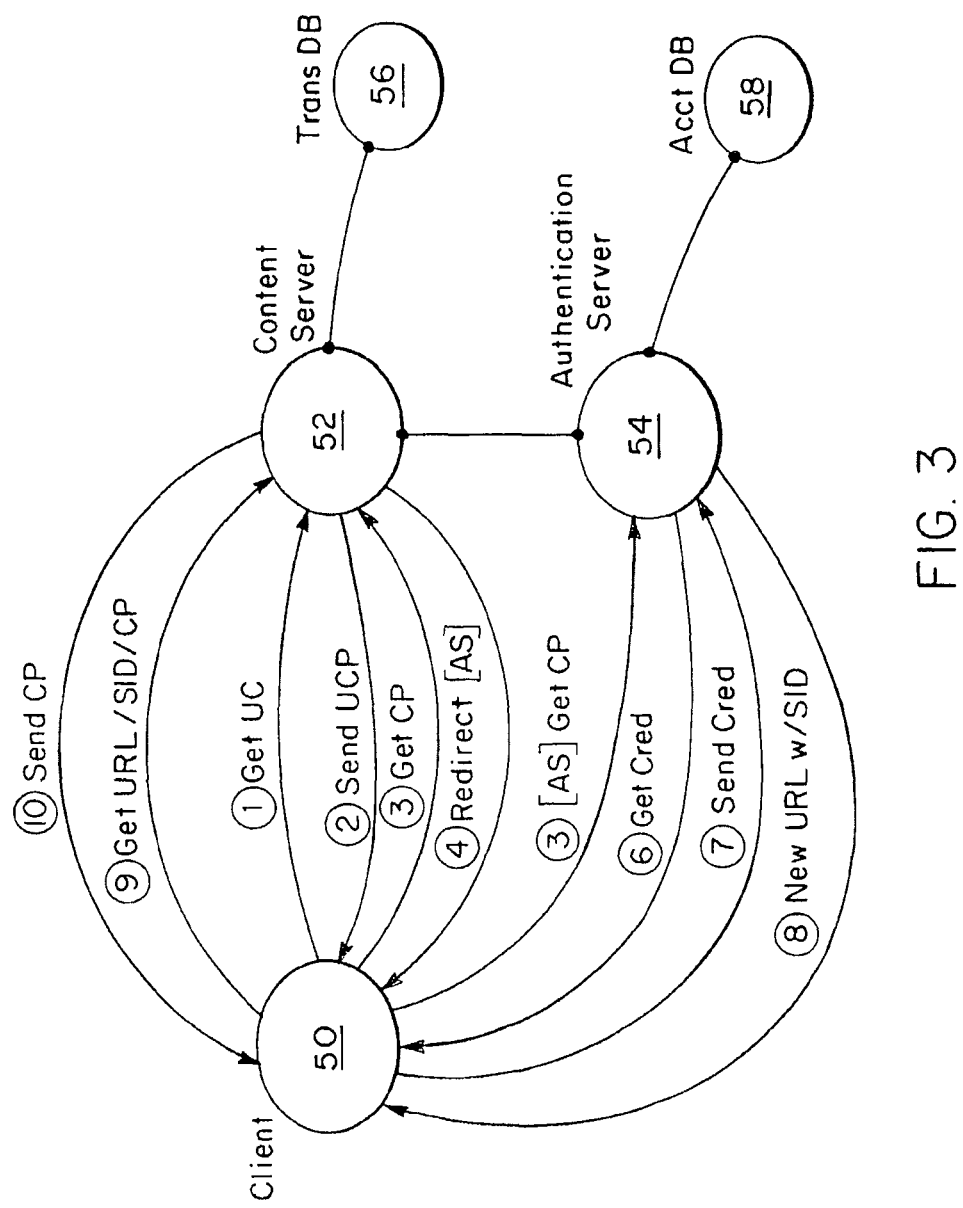
FIG. 3 illustrates an example of a client-server exchange session involving the access control and monitoring method of the present invention.

FIG. 3, illustrates a typical client-server exchange involving the access control and monitoring method of the present invention. In Step 1, the client 50 running a browser transmits a GET request through a network for an uncontrolled page (UCP). For example, the user may request an advertisement page by transmitting a URL "http://content.com/advertisement", where "content.com" is the server name and "advertisement" is the uncontrolled page name. In Step 2, the content server 52 processes the GET request and transmits the requested page, "advertisement". The content server also logs the GET request in the transaction database 56 by recording the URL, the client IP address, and the current time.

In Step 3, the user on the client machine may elect to traverse a link in the advertisement page directed to a controlled page (CP). For example, the advertisement page may contain a link to a controlled page called "report". Selecting this link causes the client browser 50 to forward a GET request through a URL which is associated with the report file "http://content.com/report". The content server 52 determines that the request is to a controlled page and that the URL does not contain an SID. In Step 4, the content server transmits a REDIRECT response to the client, and, in Step 5, the browser automatically sends the REDIRECT URL to the authentication server 54. The REDIRECT URL sent to the authentication server may contain the following string: "http://auth.com/authenticate?domain=[domain]&URL=http://content.com/report".

The authentication server processes the REDIRECT and determines whether user credentials (CRED) are needed for authorization. In Step 6, the authentication server transmits a "CHALLENGE" response to the client. As previously described, typical credentials consist of user name and password. An authorization header based on the credential information is then forwarded by the client browser to the authentication server. For example, a GET URL having such an authorization header is: "http://autho.com/authenticate?domain=[domain]&URL=http://content.com/report and the authorization header may be: "AUTHORIZE:[authorization]".

The authentication server processes the GET request by checking the Account Database 58. If a valid account exists for the user, an SID is issued which authorizes access to the controlled page "report" and all the other pages within the domain.

As previously described, the preferred SID comprises a compact ASCII string that encodes a user identifier, the current domain, a key identifier, an expiration time, the client IF address, and an unforgeable digital signature. In Step 8, the authentication server redirects the client to the tagged URL, "http://content.com/[SID]/report", to the client. In Step 9, the tagged URL is automatically forwarded by the browser as a GET request to the content server. The content server logs the GET request in the Transaction database 56 by recording the tagged URL, the client IF address, and the current time. In Step 10, the content server, upon validating the SID, transmits the requested controlled page "report" for display on the client browser.

According to one aspect of the present invention, the content server periodically evaluates the record contained in the transaction log 56 to determine the frequency and duration of accesses to the associated content server. The server counts requests to particular pages exclusive of repeated requests from a common client in order to determine the merits of the information on different pages for ratings purposes. By excluding repeated calls, the system avoids distortions by users attempting to "stuff the ballot box."

In one embodiment, the time intervals between repeated requests by a common client are measured to exclude those requests falling within a defined period of time.

Additionally, the server may, at any given time, track access history within a client-server session. Such a history profile informs the service provider about link transversal frequencies and link paths followed by users. This profile is produced by filtering transaction logs from one or more servers to select only transactions involving a particular user ID (UID). Two subsequent entries, A and B, corresponding to requests from a given user in these logs represent a link traversal from document A to document B made by the user in question. This information may be used to identify the most popular links to a specific page and to suggest where to insert new links to provide more direct access. In another embodiment, the access history is evaluated to determine traversed links leading to a purchase of a product made within commercial pages. This information may be used, for example, to charge for advertising based on the number of link traversals from an advertising page to a product page or based on the count of purchases resulting from a path including the advertisement. In this embodiment, the server can gauge the effectiveness of advertising by measuring the number of sales that resulted from a particular page, link, or path of links. The system can be configured to charge the merchant for an advertising page based on the number of sales that resulted from that page.

According to another aspect of the present invention, a secondary server, such as the authentication server 200 in FIG. 2B, may access a prearranged user profile from the account database 216 and include information based on such a profile in the user identifier field of the SID. In a preferred embodiment, the content server may use such an SID to customize user requested pages to include personalized content based on the user identifier field of the SID.

In another aspect of the invention, the user may gain access to domain of servers containing journals or publications through a subscription. In such a situation, the user may purchase the subscription in advance to gain access to on-line documents through the Internet. The user gains access to a subscribed document over the Internet through the authorization procedure as described above where an authorization indicator is preferably embedded in a session identifier. In another embodiment, rather than relying on a prepaid subscription, a user may be charged and billed each time he or she accesses a particular document through the Internet. In that case, authorization may not be required so long as the user is fully identified in order to be charged for the service. The user identification is most appropriately embedded in the session identifier described above.

Figure 6:
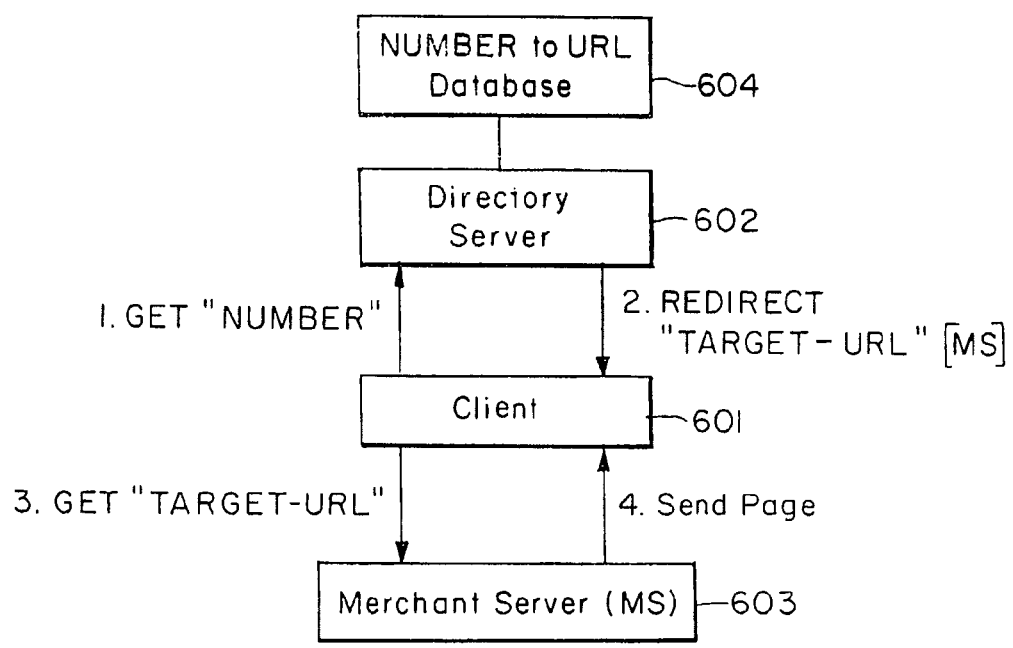
FIG. 6 is a diagram describing the details of the translation of telephone numbers to URL5.

In another aspect of the invention, facilities are provided to allow users to utilize conventional telephone numbers or other identifiers to access merchant services. These merchant services can optionally be protected using SID5. In a preferred embodiment, as shown in FIG. 6, a Web browser client 601 provides a "dial" command to accept a telephone number from a user, as by clicking on a "dial" icon and inputting the telephone number through the keyboard. The browser then constructs a URL of the form "http://directory.net/NUMBER", where NUMBER is the telephone number or other identifier specified by the user, The browser then performs a GET of the document specified by this URL, and contacts directory server 602, sending the NUMBER requested in Message 1.

In another embodiment, implemented with a conventional browser, client 601 uses a form page provided by directory server 601 that prompts for a telephone number or other identifier in place of a "dial" command, and Message 1 is a POST message to a URL specified by this form page.

Once NUMBER is received by directory server 601, the directory server uses database 604 to translate the NUMBER to a target URL that describes the merchant server and document that implements the service corresponding to NUMBER. This translation can ignore the punctuation of the number, therefore embedded parenthesis or dashes are not significant.

In another embodiment an identifier other than a number may be provided. For example, a user may enter a company name or product name without exact spelling. In such a case a "soundex" or other phonetic mapping can be used to permit words that sound alike to map to the same target URL. Multiple identifiers can also be used, such as a telephone number in conjunction with a product name or extension.

In Message 2, Directory server 602 sends a REDIRECT to client 601, specifying the target URL for NUMBER as computed from database 604. The client browser 601 then automatically sends Message 3 to GET the contents of this URL. Merchant server 603 returns this information in Message 4. The server 602 might have returned a Web page to the client to provide an appropriate link to the required document. However, because server 602 makes a translation to a final URL and sends a REDIRECT rather than a page to client 601, the document of message 4 is obtained without any user action beyond the initial dial input.

The Target URL contained in Message 3 can be an ordinary URL to an uncontrolled page, or it can be a URL that describes a controlled page. If the Target URL describes a controlled page then authentication is performed as previously described. The Target URL can also describe a URL that includes an SID that provides a preauthorized means of accessing a controlled page.

Among benefits of the "dial" command and its implementation is an improved way of accessing the Internet that is compatible with conventional telephone numbers and other identifiers. Merchants do not need to alter their print or television advertising to provide an Internet specific form of contact information, and users do not need to learn about URL5.

In the approach a single merchant server can provide multiple services that correspond to different external "telephone numbers" or other identifiers. For example, if users dial the "flight arrival" number they could be directed to the URL for the arrival page, while, if they dial the "reservations" number, they would be directed to the URL for the reservations page. A "priority gold" number could be directed to a controlled page URL that would first authenticate the user as belonging to the gold users group, and then would provide access to the "priority gold" page. An unpublished "ambassador" number could be directed to a tagged URL that permits access to the "priority gold" page without user authentication.

This invention has particular application to network sales systems such as presented in U.S. patent application Ser. No. 08/328,133, filed Oct. 24, 1994, by Payne et al. which is incorporated herein by reference.

EQUIVALENTS

Those skilled in the art will know, or be able to ascertain using no more than routine experimentation, many equivalents to the specific embodiments or the invention described herein. These and all other equivalents are intended to be encompassed by the following claims.

What is claimed is:

1. A secure electronic shopping method, comprising:
receiving an initial link message from a client computer at a merchant server using a transfer format suitable for communication over the Internet;
transmitting a session link message in response to the initial link message back to the client computer via the Internet, the session link message comprising a session identifier used to maintain session state data with respect to an electronic shopping session between the client computer and the merchant server, wherein the session identifier is distinct from identification of the client computer or a user of the client computer, and wherein the initial link message does not include the session identifier;
causing the client computer to store the session state data at the client computer; and
completing the electronic shopping session between the client computer and the merchant server using the session identifier to identify a series of related requests corresponding to the electronic shopping session made by the client computer to the merchant server, and communicating with a payment server to authorize a purchase associated with the shopping session.

2. The method of claim 1, further comprising:
transmitting data associated with the shopping session to the payment server;
the payment server using the data associated with the shopping session to authorize the purchase associated with the shopping session.

3. The method of claim 2, further comprising:
storing a user account at the payment server associated with a user of the client computer;
the payment server comparing the data associated with the shopping session to information stored in the user account in order to determine whether to authorize the purchase associated with the shopping session.

4. The method of claim 3, wherein the information stored in the user account includes credit card information for the user of the client computer.

5. The method of claim 1, further comprising:
the merchant server authorizing the download of the purchased product by the client computer in response to the payment server authorizing the purchase associated with the shopping session.

6. The method of claim 5, wherein the purchased product is selected from the group consisting of an electronic document, a multimedia data file, an audio data file, and a video data file.

7. The method of claim 2, further comprising:
associating the payment server with a plurality of merchant servers;
wherein the data associated with a shopping session includes data identifying a particular merchant server; and
wherein the data transmitted to the payment server includes the merchant identifying data.

8. The method of claim 1, further comprising:
updating the session state data and causing the client computer to re-store at least a portion of the session state data during the shopping session between the client computer and the merchant server.

9. The method of claim 1, wherein at least a portion of the stored session state data includes encrypted data.

10. The method of claim 1, wherein at least a portion of the stored session state data is digitally signed.

11. The method of claim 2, farther comprising:
associating a domain with the merchant server;
encoding the domain of the merchant server into the session state data; and
transmitting the domain of the merchant server to the payment server in order to authorize the purchase associated with the shopping session.

12. The method of claim 1, further comprising:
the merchant server receiving one or more requests to purchase products from the client computer;
in response to each request to purchase a product, storing a product identifier in a shopping cart record associated with a user of the client computer; and
completing a shopping session between the client computer and the merchant server and communicating with the payment server to authorize a purchase associated with any products identified in the shopping cart record.

13. The method of claim 12, further comprising:
associating a shopping cart identifier with the shopping cart record; and
transmitting the shopping cart identifier to the payment server to authorize the purchase associated with any products identified in the shopping cart record.

14. The method of claim 12, further comprising:
retrieving product identification data from the shopping cart record; and
causing the client computer to display the product identification data.

15. The method of claim 1, further comprising:
receiving a plurality of requests to purchase products from the client computer at a plurality of merchant servers;
in response to each request to purchase a product, storing a product identifier and a merchant identifier in a shopping cart record associated with a user of the client computer; and
completing a shopping session between the client computer and the merchant servers and communicating with the payment server to authorize a purchase associated with any products identified in the shopping cart record.

16. The method of claim 1, wherein the transfer format suitable for communication over the Internet is the hypertext transfer protocol.

17. The method of claim 1, wherein the session link message includes user identification data.

18. The method of claim 1, wherein the session link message includes authentication data.

19. The method of claim 1, further comprising:
the merchant server accessing an authentication server to obtain the session link message.

20. The method of claim 19, further comprising:
causing the client computer to prompt a user of the client computer to provide credentials to the authentication server; and
the authentication server processing the provided credentials and generating the session link message.

21. The method of claim 20, further comprising:
storing a user account profile associated with the user of the client computer; and
the authentication server accessing the user account profile and comparing data stored therein with the provided credentials before generating the session link message.

22. The method of claim 1, further comprising:
maintaining a transaction log at the merchant server, the transaction log including session state data associated with an electronic shopping session between the client computer and the merchant server.

23. The method of claim 1, wherein the session link message includes information from a user account profile stored in an account database, the method further comprising:
the merchant server using the information from the user account profile to customize communications to the client computer.

24. The method of claim 23, wherein the customized communications include advertisements.

25. The method of claim 1, further comprising:
for each completed shopping session between the client computer and the merchant computer, storing a purchase transaction record in a transaction database.

26. The method of claim 25, further comprising:
transmitting an electronic statement to the client computer, the electronic statement including links to the purchase transaction records stored in the transaction database.

27. The method of claim 26, further comprising:
selecting one of the links on the electronic statement at the client computer; and
in response thereto, obtaining the purchase transaction record from the transaction database.

28. The method of claim 26, wherein the electronic statement includes links to purchase transaction records that have occurred in a current month.

29. The method of claim 28, wherein the electronic statement includes at least one link to purchase transaction records that have occurred in a prior month.

30. The method of claim 26, wherein the electronic statement is a web page.

31. The method of claim 26, wherein the electronic statement is transmitted to the client computer by e-mail.

32. A secure electronic shopping method in a network having a plurality of merchant servers and a payment server, the payment server including a plurality of user accounts for use in authorizing purchase transactions between users and the plurality of merchant servers, comprising:

conducting an electronic shopping session between a user computer system and one of the plurality of merchant servers, the merchant server and the user computer system exchanging one or more session link messages comprising a session identifier used to maintain session state data with respect to the electronic shopping session, wherein the session identifier is first transmitted to the user computer system in response to an initial request received from the user computer system, wherein the session identifier is distinct from identification of the user computer system or a user of the user computer system, and wherein the initial link message does not include the session identifier;

causing the user computer system to store the session state data;

completing the electronic shopping session between the user computer system and the merchant server using the session identifier to identify a series of related requests corresponding to the electronic shopping session made by the user computer system to the merchant server, and communicating with a payment server accessing one of the plurality of user accounts in order to authorize a purchase associated with the shopping session; and receiving purchase authorization data at the merchant server and enabling the user computer system to download the purchased product.

33. The method of claim 32, further comprising:
transmitting at least a portion of the session state data to the payment server;
the payment server using the portion of the session state data to authorize the purchase associated with the shopping session.

34. The method of claim 32, wherein the session state data identifies the merchant server associated with the shopping session.

35. The method of claim 32, wherein the purchased product is selected from the group consisting of an electronic document, a multimedia data file, an audio data file, and a video data file.

36. The method of claim 32, wherein the session link message does not include the user's credit card data, such credit card data being stored in the user account at the payment server.

37. The method of claim 33, wherein the session state data includes data identifying a particular merchant server, and wherein the data transmitted to the payment server includes the merchant identifying data.

38. The method of claim 32, further comprising:
updating the session state data and re-storing at least a portion of the session state data at the user computer system during the shopping session between the user computer system and the merchant server.

39. The method of claim 32, wherein at least a portion of the stored session state data includes encrypted data.

40. The method of claim 32, wherein at least a portion of the stored session state data is digitally signed.

41. The method of claim 33, further comprising:
associating a domain with at least one of the merchant servers;
encoding the domain of the at least one merchant server into the session state data; and
transmitting the domain of the at least one merchant server to the payment server in order to authorize the purchase associated with the shopping session.

42. The method of claim 32, further comprising:
receiving one or more requests to purchase products from the user computer system at the merchant server;
in response to each request to purchase a product, storing a product identifier in a shopping cart record associated with user computer system; and
completing a shopping session between the user computer system and the merchant server and communicating with the payment server to authorize a purchase associated with any products identified in the shopping cart record.

43. The method of claim 42, further comprising:
associating a shopping cart identifier with the shopping cart record; and
transmitting the shopping cart identifier to the payment server to authorize the purchase associated with any products identified in the shopping cart record.

44. The method of claim 42, further comprising:
retrieving product identification data from the shopping cart record; and
causing the user computer system to display the product identification data.

45. The method of claim 32, further comprising:
receiving a plurality of requests to purchase products from the user computer system to a plurality of merchant servers;
in response to each request to purchase a product, storing a product identifier and a merchant identifier in a shopping cart record associated with the user computer system; and
completing a shopping session between the user computer system and the merchant servers and communicating with the payment server to authorize a purchase associated with any products identified in the shopping cart record.

46. The method of claim 32, further comprising:
the merchant server accessing an authentication server to obtain the session link message.

47. The method of claim 46, further comprising:
causing the user computer system to prompt a user of the user computer system to provide credentials to the authentication server; and
the authentication server processing the provided credentials and generating the session link message.

48. The method of claim 47, further comprising:
the authentication server accessing a user account and comparing data stored therein with the provided credentials before generating the session link message.

49. The method of claim 32, further comprising:
maintaining a transaction log at the merchant server, the transaction log including session state data associated with an electronic shopping session between the user computer system and the merchant server.

50. The method of claim 32, wherein the session link message includes information from a user account associated with the user computer system, the method further comprising:
the merchant server using the information from the user account to customize communications to the user computer system.

51. The method of claim 50, wherein the customized communications include advertisements.

52. The method of claim 32, further comprising:
for each completed shopping session between the user computer system and the merchant computer, storing a purchase transaction record in a transaction database.

53. The method of claim 52, further comprising:
transmitting an electronic statement to the user computer system, the electronic statement including links to the purchase transaction records stored in the transaction. database.

54. The method of claim 53, further comprising:
selecting one of the links on the electronic statement at the user computer system; and in response thereto, obtaining the purchase transaction record from the transaction database.

55. The method of claim 53, wherein the electronic statement includes links to purchase transaction records that have occurred in a current month.

56. The method of claim 55, wherein the electronic statement includes at least one link to purchase transaction records that have occurred in a prior month.

57. The method of claim 53, wherein the electronic statement is a web page.

58. The method of claim 53, wherein the electronic statement is transmitted to the client computer by e-mail.

59. An electronic payment authorization method for processing purchase transactions between user computers and a plurality of merchant servers using a transfer format suitable for communication over the Internet, wherein the user computers and merchant servers are programmed to exchange session state data associated with an electronic shopping session, comprising:
receiving session state data comprising a session identifier and associated with an electronic shopping session between a user computer and a merchant server at a payment server, wherein the session identifier is first transmitted to the user computer in response to an initial request received from the user computer, wherein the session identifier is distinct from identification of the user computer or a user of the user computer, and wherein the initial link message does not include the session identifier;
accessing a user account at the payment server associated with a user computer; and processing the session state data and the user account in order to authorize a purchase associated with the electronic shopping session using the session identifier to identify a series of related requests corresponding to the electronic shopping session made by the user computer to the merchant server.

60. The electronic payment authorization method of claim 59, further comprising:
accessing credit card data associated with the user account in order to authorize the purchase.

61. The electronic payment authorization method of claim 59, further comprising:
transmitting payment authorization data from the payment server to the merchant server in order to cause the merchant server to deliver a purchased product to the user computer.

62. The electronic payment authorization method of claim 61, wherein the purchased product is selected from the group consisting of an electronic document, a multimedia data file, an audio data file, and a video data file.

63. The electronic payment authorization method of claim 59, wherein the user account includes credit card information associated with a user of the user computer.

64. The electronic payment authorization method of claim 59, wherein the session state data includes data identifying a particular merchant server, and wherein the session state data received at the payment server includes the merchant identifying data.

65. The electronic payment authorization method of claim 59, further comprising:
receiving a shopping cart identifier at the payment server, the payment server accessing an electronic shopping cart of identified products and authorizing the purchase of the identified products in the electronic shopping cart.

66. The electronic payment authorization method of claim 59, wherein the transfer format suitable for communication over the Internet is the hypertext transfer protocol.

67. The electronic payment authorization method of claim 59, wherein the session state data includes encrypted information.

68. The electronic payment authorization method of claim 59, further comprising:
for each completed shopping session between a user computer and a merchant server, storing a purchase transaction record in a transaction database.

69. The electronic payment authorization method of claim 68, further comprising:
transmitting an electronic statement from the payment server to the user computer, the electronic statement including links to the purchase transaction records stored in the transaction database.

70. The electronic payment authorization method of claim 69, further comprising:
receiving a request for a purchase transaction record from the user computer in response to the user computer selecting one of the links on the electronic statement; and
in response thereto, obtaining the purchase transaction record from the transaction database and transmitting it to the user computer.

71. The electronic payment authorization method of claim 69, wherein the electronic statement includes links to purchase transaction records that have occurred in a current month.

72. The electronic payment authorization method of claim 71, wherein the electronic statement includes at least one link to purchase transaction records that have occurred in a prior month.

73. The electronic payment authorization method of claim 69, wherein the electronic statement is a web page.

74. The electronic payment authorization method of claim 69, wherein the electronic statement is transmitted to the user computer by e-mail.

75. A payment server for receiving and authorizing purchase authorization requests across multiple merchant domains using a transfer format suitable for communication over the Internet,
the purchase authorization requests including session state data comprising a session identifier associated with electronic shopping sessions carried out between user computer systems and merchant servers via the Internet, wherein the session identifier is first transmitted to the user computer systems in response to an initial request received from the user computer systems, wherein the session identifier is distinct from identification of the user computer systems or users of the user computer systems, and wherein the initial link message does not include the session identifier, comprising:
a network interface for enabling the payment server to communicate with merchant servers and user computer systems via the Internet;

a user account database for storing user identification for a plurality of users associated with the user computer systems; and a data processor for receiving purchase authorization requests, wherein the data processor authorizes product purchases between the user computer systems and the merchant servers based upon the session state data and the user identification information stored in the user account database using the session identifier to identify a series of related requests corresponding to the electronic shopping session made by the user computer systems to the merchant servers.

76. The payment server of claim 75, wherein the data processor accesses credit card data associated with the user account in order to authorize the purchase.

77. The payment server of claim 75, wherein the data processor causes payment authorization data to be transmitted from the payment server to the merchant server via the Internet in order to cause the merchant server to deliver a purchased product to the user computer.

78. The payment server of claim 77, wherein the purchased product is selected from the group consisting of an electronic document, a multimedia data file, an audio data file, and a video data file.

79. The payment server of claim 75, wherein the user account includes credit card information associated with a user of the user computer.

80. The payment server of claim 75, wherein the session state data includes data identifying a particular merchant server, and wherein the purchase authorization requests received at the payment server include the merchant identifying data.

81. The payment server of claim 75, wherein the data processor receives a shopping cart identifier that enables it to access an electronic shopping cart of identified products, and authorizes the purchase of the identified products in the electronic shopping cart.

82. The payment server of claim 75, wherein the transfer format suitable for communication over the Internet is the hypertext transfer protocol.

83. The payment server of claim 75, wherein the session state data includes encrypted information.

84. The payment server of claim 75, further comprising:
a transaction database for storing purchase transaction records associated with an electronic shopping session between a user computer and a merchant server.

85. The payment server of claim 84, wherein the data processor causes an electronic statement to be transmitted to the user computer, the electronic statement including links to the purchase transaction records stored in the transaction database.

86. The payment server of claim 85, wherein the electronic statement includes links to purchase transaction records that have occurred in a current month.

87. The payment server of claim 86, wherein the electronic statement includes at least one link to purchase transaction records that have occurred in a prior month.

88. The payment server of claim 85, wherein the electronic statement is a web page.

89. The payment server of claim 85, wherein the electronic statement is transmitted to the user computer by e-mail.

90. A method of purchasing access-controlled data files stored within a content server domain, comprising:
exchanging session data, comprising a session identifier, between a user computer system and a content server associated with the content server domain using a transfer format suitable for communication over the Internet and storing the session data at the user computer system, wherein the session identifier is first transmitted to the user computer system in response to an initial request received from the user computer system, wherein the session identifier is distinct from identification of the user computer system or a user of the user computer system, and wherein the initial link message does not include the session identifier, the session data relating to a purchase of an access-controlled data file stored within the content server domain using the session identifier to identify a series of related requests corresponding to the electronic shopping session made by the user computer system to the content server; and transmitting at least a portion of the stored session data to a payment sever, the payment server accessing a user account associated with the user computer system in order to authorize the purchase of the access-controlled data file.

91. The method of claim 90, further comprising:
the payment server prompting the user computer system to provide credentials for purchasing the access-controlled data file; and
comparing the user supplied credentials to information stored in the user account associated with the user computer system in order to authorize the purchase of the access-controlled data file.

92. The method of claim 90, wherein the access-controlled data file is selected from the group consisting of an electronic document, a multimedia data file, an audio data file and a video data file.

93. The method of claim 90, further comprising:
transmitting a purchase authorization message to the content server in order to access the access-controlled data file stored within the content server domain.

94. The method of claim 90, wherein the session data includes a user identification associated with the user computer system and a domain identification associated with the content server domain, the payment server processing the user identification and the domain identification in order to authorize the purchase of the access-controlled data file.

95. The method of claim 90, further comprising:
determining an access level of the access-controlled data file; and
prompting the user computer system to provide credentials for purchasing the access-controlled data file.

96. The method of claim 90, further comprising:
determining an access level of the access-controlled data file; and
accessing the user account associated with the user computer system in order to determine whether to authorize the purchase of the access-controlled data file.

97. The method of claim 90, wherein the user account includes credit card information for the user of the user computer system.

98. The method of claim 90, further comprising:
the content server authorizing the download of the purchased access-controlled data file by the user computer in response to the payment server authorizing the purchase.

99. The method of claim 90, further comprising:
associating the payment server with a plurality of content servers, each content server being associated with a content server domain;
wherein the session data includes data identifying a particular content server domain; and wherein the data transmitted to the payment server includes the content server domain identifying data.

100. The method of claim 90, wherein at least a portion of the stored session data includes encrypted data.

101. The method of claim 90, wherein at least a portion of the stored session data is digitally signed.

102. The method of claim 90, further comprising:
transmitting one or more requests to purchase access-controlled data files from the user computer system to the content server;
in response to each request to purchase an access-controlled data file, storing a data file identifier in a shopping cart record associated with a user of the user computer system; and
transmitting a shopping cart identifier associated with the shopping cart record to the payment server to authorize the purchase of the access-controlled data files identified in the shopping cart record.

103. The method of claim 102, further comprising:
retrieving data file identification data from the shopping cart record; and
displaying the data file identification data at the user computer system.

104. The method of claim 90, wherein the transfer format suitable for communication over the Internet is the hypertext transfer protocol.

105. The method of claim 90, further comprising:
maintaining a transaction log at the content server, the transaction log including session data associated with the purchase of an access-controlled data file stored within the content server domain.

106. The method of claim 90, wherein the session data includes information from a user account profile stored in an account database, the method further comprising:
the content server using the information from the user account profile to customize communications to the user computer system.

107. The method of claim 106, wherein the customized communications include advertisements.

108. The method of claim 90, further comprising:
for each completed purchase of an access-controlled data file between the user computer system and the content server, storing a purchase transaction record in a transaction database.

109. The method of claim 108, further comprising:
transmitting an electronic statement to the user computer system, the electronic statement including links to the purchase transaction records stored in the transaction database.

110. The method of claim 109, further comprising:
selecting one of the links on the electronic statement at the user computer system; and
in response thereto, obtaining the purchase transaction record from the transaction server.

111. The method of claim 109, wherein the electronic statement includes links to purchase transaction records that have occurred in a current month.

112. The method of claim 111, wherein the electronic statement includes at least one link to purchase transaction records that have occurred in a prior month.

113. The method of claim 109, wherein the electronic statement is a web page.

114. The method of claim 109, wherein the electronic statement is transmitted to the user computer system by e-mail.

* * * * *

UNITED STATES PATENT AND TRADEMARK OFFICE
CERTIFICATE OF CORRECTION

PATENT NO. : 9,917,827 B2  
APPLICATION NO. : 11/971361  
DATED : March 13, 2018  
INVENTOR(S) : Levergood et al.

Page 1 of 1

It is certified that error appears in the above-identified patent and that said Letters Patent is hereby corrected as shown below:

On the Title Page

On page 2, item (63) under "Related U.S. Application Data", replace "8,606,900" with --8,606,900, and application No. 09/005,479 is furthermore a Continuation of application No. 08/474,096, filed on Jun. 7, 1995, now Pat. No. 5,708,780--.

In the Claims

In Column 14, Line 6, replace "with user" with --with the user--.

In Column 15, Line 4, replace "transaction." with --transaction--.

Signed and Sealed this  
Twenty-ninth Day of October, 2019

Andrei Iancu  
*Director of the United States Patent and Trademark Office*